US006509559B1

(12) United States Patent
Ulrich et al.

(10) Patent No.: US 6,509,559 B1
(45) Date of Patent: Jan. 21, 2003

(54) BINARY OPTICAL GRATING AND METHOD FOR GENERATING A MOIRE PATTERN FOR 3D IMAGING

(75) Inventors: Franz W. Ulrich, Minneapolis; John Ma, Burnsville; Darcy J. Hart, Lino Lakes, all of MN (US)

(73) Assignee: PPT Vision, Inc., Eden Prairie, MN (US)

( * ) Notice: Subject to any disclaimer, the term of this patent is extended or adjusted under 35 U.S.C. 154(b) by 70 days.

(21) Appl. No.: 09/598,069

(22) Filed: Jun. 20, 2000

(51) Int. Cl.⁷ .................................................. H01J 5/16

(52) U.S. Cl. .............................. 250/237 G; 250/237 R; 356/305; 356/330

(58) Field of Search ..................... 250/237 G, 237 R; 356/305, 330, 334, 499, 521, 365, 239.3, 237.4, 237.5

(56) References Cited

U.S. PATENT DOCUMENTS

| | | | |
|---|---|---|---|
| 3,069,654 A | 12/1962 | Hough | 340/146.3 |
| 4,212,073 A | 7/1980 | Balasubramanian | 364/562 |
| 4,370,300 A | 1/1983 | Mori et al. | 422/108 |
| 4,639,139 A | 1/1987 | Wyant et al. | 356/359 |
| 4,641,972 A | 2/1987 | Halioua et al. | 356/376 |
| 4,705,395 A | 11/1987 | Hageniers | 356/1 |
| 4,965,665 A | 10/1990 | Amir | 358/101 |
| 4,967,066 A | 10/1990 | Beraldin et al. | 250/205 |
| 4,967,284 A | 10/1990 | Yoshida et al. | 358/300 |
| 4,991,968 A | 2/1991 | Yonescu et al. | 356/376 |

(List continued on next page.)

FOREIGN PATENT DOCUMENTS

| | | | |
|---|---|---|---|
| EP | 0638801 | 2/1995 | G01N/21/88 |
| WO | 98/02716 | 1/1998 | G01B/11/03 |

OTHER PUBLICATIONS

Ballard, D.H., "Generalizing the Hough Transform to Detect Arbitrary Shapes", *Pattern Recognition*, 13 (2), Pergamon Press, pp. 183–194, (1981).

Davies, E.R., *Machine Vision: Theory, Algorithms, Practicalities*, 2nd Edition, Academic Press, San Diego, pp. 195–210, (1997).

Yang, H.S., et al., "Determination of the Identity, Position and Orientation of the Topmost Object in a Pile: Some Further Experiments", IEEE International Conference on Robotics and Automation, 1, San Francisco. CA, 293–298, (1986).

*Primary Examiner*—Robert H. Kim
*Assistant Examiner*—Courtney Thomas
(74) *Attorney, Agent, or Firm*—Schwegman, Lundberg, Woessner & Kluth, P.A.

(57) ABSTRACT

In the context of a machine-vision system for inspecting a part, a method and apparatus to provide high-speed high accuracy 3D (three-dimensional) inspection of manufactured parts by reducing vibration. The invention provides a method, a grating, and a 3D imaging system using a binary grating in the projection system to generate patterned light. The grating includes a binary grating having a cycle pattern, wherein each cycle includes a first substantially clear stripe of a first width and a first substantially opaque stripe of substantially the same first width, and between the first substantially clear stripe and the first substantially opaque stripe are a second substantially opaque stripe of a second width narrower than the first width, and a second substantially clear stripe of substantially the second width. In some embodiments, a plurality of alternating relatively narrow clear and opaque stripes are positioned between the relatively wider first substantially clear stripe and first substantially opaque stripe, in order that the optics of the projection optical system and the relative motion between the projection light pattern and the imaging time (trapezoidal integration) smooth the resulting pattern to provide a linear sine-wave-like pattern of projection light.

24 Claims, 27 Drawing Sheets

U.S. PATENT DOCUMENTS

| | | | |
|---|---|---|---|
| 5,060,065 A | 10/1991 | Wasserman | 358/106 |
| 5,085,502 A | 2/1992 | Womack et al. | 356/376 |
| 5,251,156 A | 10/1993 | Heier et al. | 364/559 |
| 5,355,221 A | 10/1994 | Cohen et al. | 356/359 |
| 5,379,107 A | 1/1995 | Hanssen et al. | 356/376 |
| 5,398,113 A | 3/1995 | de Groot | 356/360 |
| 5,426,302 A | 6/1995 | Marchman et al. | 250/306 |
| 5,465,152 A | 11/1995 | Bilodeau et al. | 356/371 |
| 5,546,189 A | 8/1996 | Svetkoff et al. | 356/376 |
| 5,561,525 A | 10/1996 | Toyonaga et al. | 356/360 |
| 5,636,025 A | 6/1997 | Bieman et al. | 356/374 |
| 5,646,733 A * | 7/1997 | Bieman | 356/376 |
| 5,680,215 A | 10/1997 | Huber et al. | 356/371 |
| 5,719,952 A | 2/1998 | Rooks | 382/150 |
| 5,745,176 A | 4/1998 | Lebens | 348/370 |
| 5,753,903 A | 5/1998 | Mahaney | 250/205 |
| 5,859,698 A | 1/1999 | Chau et al. | 356/237 |
| 5,943,125 A | 8/1999 | King et al. | 356/237.1 |
| 6,022,124 A | 2/2000 | Bourn et al. | 362/247 |
| 6,069,701 A | 5/2000 | Hashimoto et al. | 356/376 |
| 6,072,898 A | 6/2000 | Beaty et al. | 382/146 |
| 6,173,070 B1 | 1/2001 | Michael et al. | 382/145 |
| 6,181,472 B1 | 1/2001 | Liu | 359/618 |
| 6,222,187 B1 | 4/2001 | Shivanandan | 250/330 |
| 6,249,347 B1 | 6/2001 | Svetkoff et al. | 356/376 |
| 6,260,000 B1 | 7/2001 | Karasaki et al. | 702/155 |
| 6,282,462 B1 | 8/2001 | Hopkins | 700/259 |

* cited by examiner

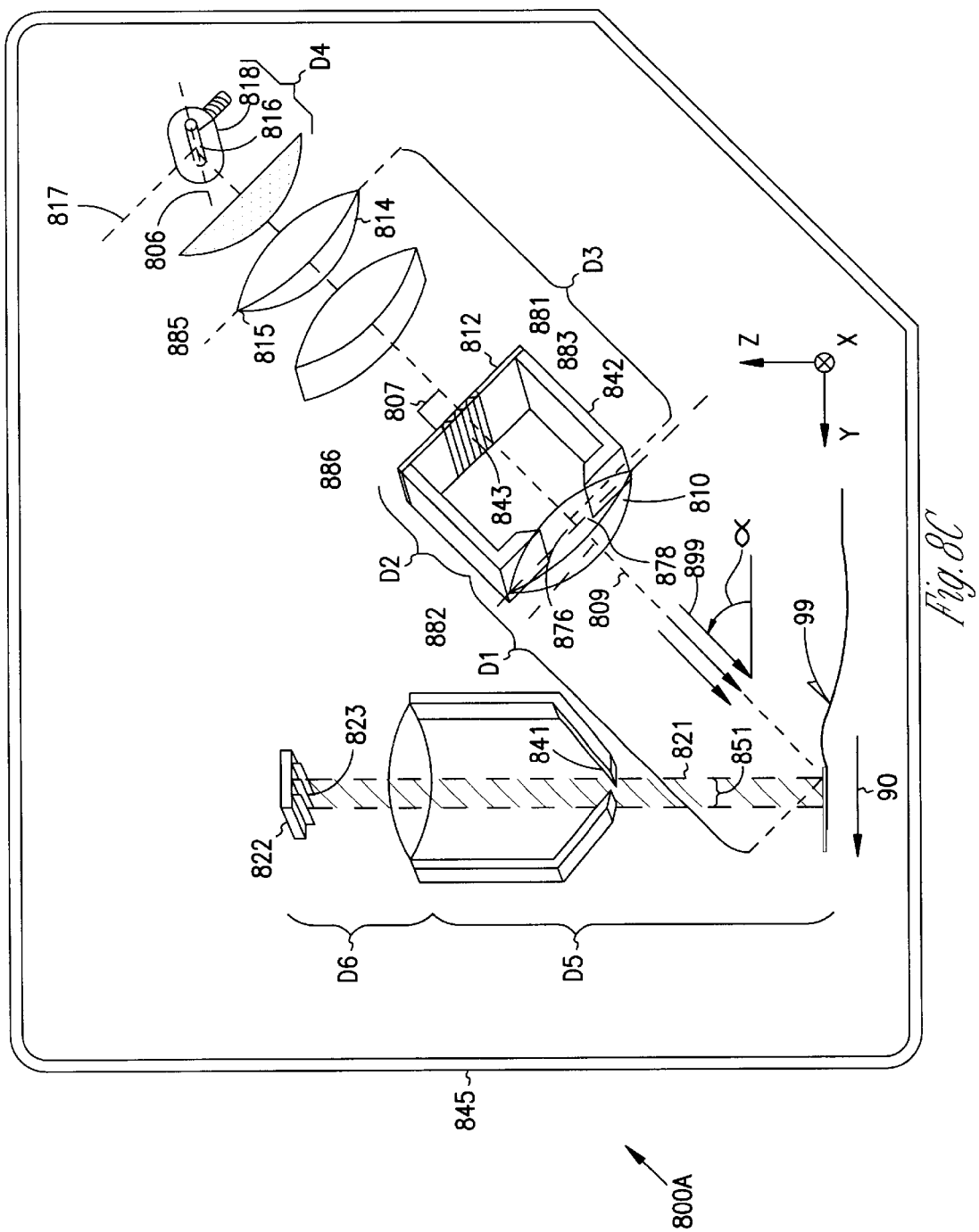

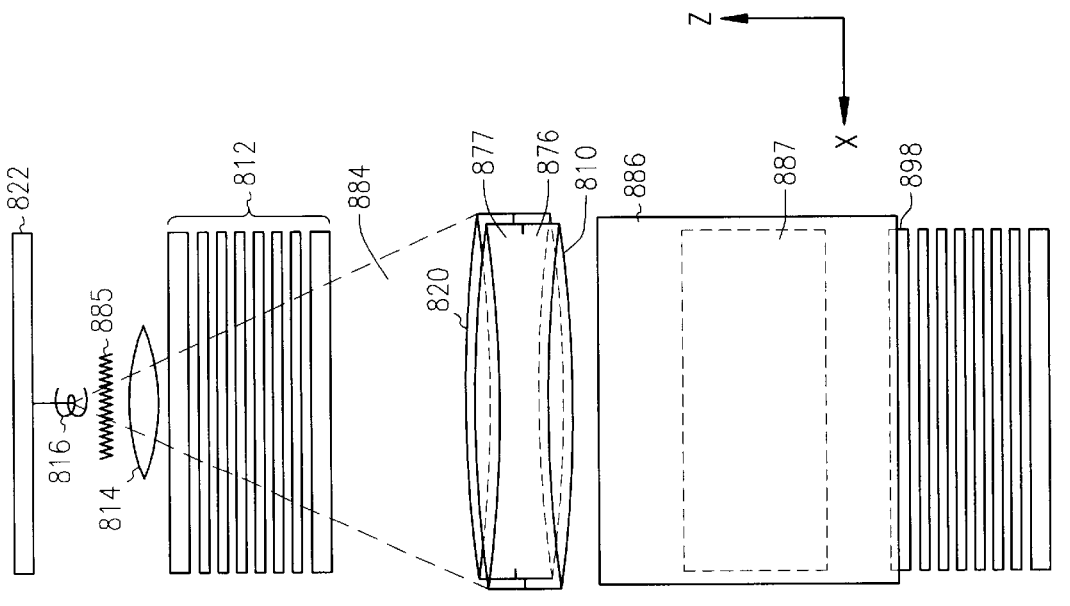
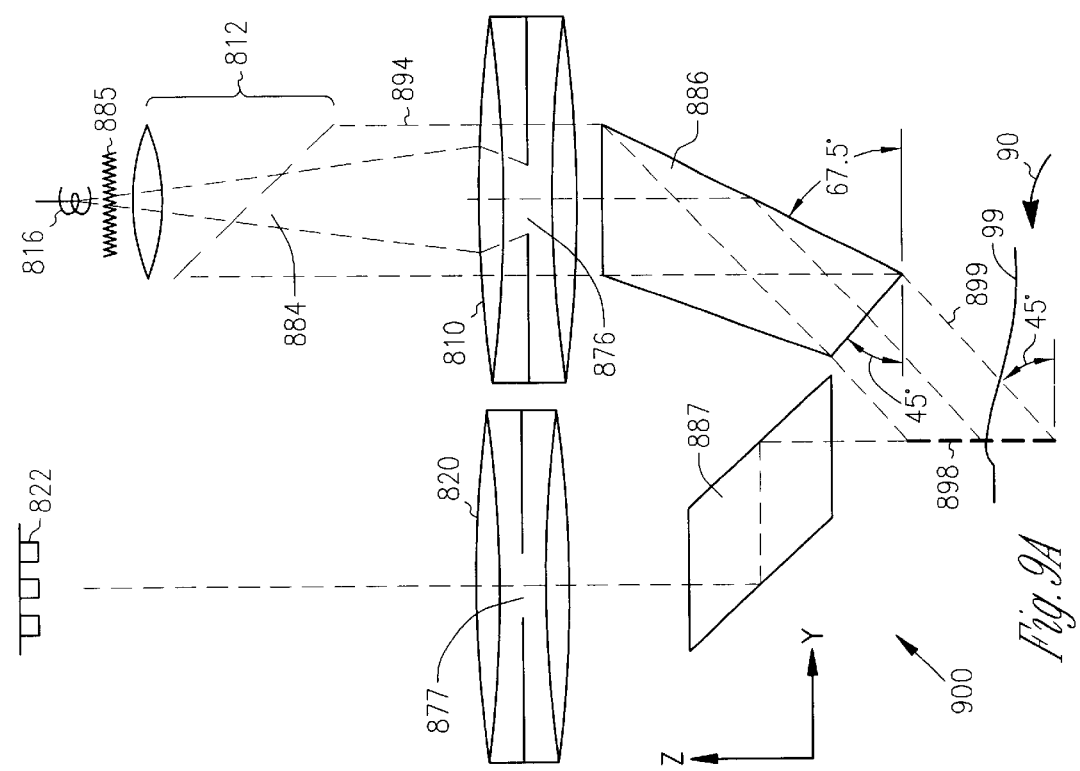

a1=2π±0 rad
a2=π±0.01 rad
a3=0.101±0.0025 rad
a4=0.154±0.005 rad
a5=0.06±0.0025 rad
a6=0.06±0.0025 rad
a7=0.154±0.005 rad
a8=0.101±0.0025 rad
a9=0.101±0.0025 rad
a10=0.154±0.005 rad
a11=0.06±0.0025 rad
a12=0.06±0.0025 rad
a13=0.154±0.005 rad
a14=0.101±0.0025 rad

BINARY OPTICAL GRATING AND METHOD FOR GENERATING A MOIRE PATTERN FOR 3D IMAGING

RELATED APPLICATIONS

This invention is related to:

U.S. patent application Ser. No. 09/350,051, entitled "CIRCUIT FOR MACHINE-VISION SYSTEM", filed Jul. 8, 1999, U.S. patent application Ser. No. 09/350,050, entitled "MACHINE-VISION SYSTEM AND METHOD FOR RANDOMLY LOCATED PARTS" filed Jul. 8, 1999, U.S. patent application Ser. No. 09/350,255, entitled "PARTS MANIPULATION AND INSPECTION SYSTEM AND METHOD", filed Jul. 8, 1999, U.S. patent application Ser. No. 09/349,684, entitled "MACHINE-VISION SYSTEMS AND,METHODS WITH UP AND DOWN LIGHTS", filed Jul. 8, 1999, U.S. patent application Ser. No. 09/349,948, entitled "METHOD AND APPARATUS TO CALCULATE BGA BALL TOPS", filed Jul. 8, 1999, U.S. patent application Ser. No.09/350,049, entitled "COMBINED 3D- AND 2D-SCANNING MACHINE-VISION SYSTEM AND METHOD", filed Jul. 8, 1999, U.S. patent application Ser. No. 09/350,037, entitled "MACHINE-VISION SYSTEM AND METHOD HAVING A SINE-WAVE PROJECTION PATTERN", filed Jul. 8, 1999, U.S. patent application Ser. No. 09/350,251, entitled "TRAY FLIPPER AND METHOD FOR PARTS INSPECTION", filed Jul. 8, 1999

U.S. patent application Ser. No. 09/596,795, entitled "PRECISION 3D SCANNER BASE AND METHOD FOR MEASURING MANUFACTURED PARTS", filed on even date herewith, U.S. patent application Ser. No. 09/597,865, entitled "3D SCANNER AND METHOD FOR MEASURING HEIGHTS AND ANGLES OF MANUFACTURED PARTS", filed on even date herewith, which are all assigned to a comnnon assignee, and which are incorporated herein by reference.

FIELD OF THE INVENTION

This invention relates to the field of machine vision, and more specifically to a method and apparatus of generating a pattern of projected light for obtaining three-dimensional inspection data for manufactured parts in a manufacturing environment.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1998–2000, PPT Vision, Inc., All Rights Reserved.

BACKGROUND OF THE INVENTION

There is a widespread need for inspection data for electronic parts in a manufacturing environment. One common inspection method uses a video camera to acquire two-dimensional images of a device-under-test.

Height distribution of a surface can be obtained by projecting a light-stripe pattern onto the surface and then re-imaging the light pattern that appears on the surface.

One technique for extracting this information based on taking multiple images (three or more) of the light pattern that appears on the surface while shifting the position (phase) of the projected light stripe pattern is referred to as phase shifting interferometry, as disclosed in U.S. Pat. Nos. 4,641,972 and 4,212,073 (incorporated herein by reference).

The multiple images are usually taken using a CCD (charge-coupled device) video camera with the images being digitized and transferred to a computer where phase-shift analysis, based on images being used as "buckets," converts the information to a contour map (i.e., a three-dimensional representation) of the surface.

The techniques used to obtain the multiple images are based on methods that keep the camera and viewed surface stationary with respect to each other while moving the projected pattern.

One technique for capturing just one bucket image using a line scan camera is described in U.S. Pat. No. 4,965,665 (incorporated herein by reference).

U.S. Pat. Nos. 5,398,113 and 5,355,221 (incorporated herein by reference) disclose white-light interferometry systems which profile surfaces of objects.

In U.S. Pat. No. 5,636,025 (incorporated herein by reference), an optical measuring system is disclosed which includes a light source, gratings, lenses, and camera. A mechanical translation device moves one of the gratings in a plane parallel to a reference surface to effect a phase shift of a projected image of the grating on the contoured surface to be measured. A second mechanical translation device moves one of the lenses to effect a change in the contour interval. A first phase of the points on the contoured surface is taken, via a four-bucket algorithm, at a first contour interval. A second phase of the points is taken at a second contour interval. A control system, including a computer, determines a coarse measurement using the difference between the first and second phases. The control system further determines a fine measurement using either the first or second phase. The displacement or distance, relative to the reference plane, of each point is determined, via the control system, using the fine and coarse measurements.

Current vision inspection systems have many problems. Among the problems are assorted problems associated generating precise, high-contrast Moire patterns for scanning Moire interferometry (SMI) measurements. Conventional systems have used 50% duty-cycle black-and-clear stripes, counting on diffraction and poor focus to blur the pattern into an approximately sine-wave pattern. Additional precision was obtained by generating a lined pattern, where each line along its edges increased in density, to obtain a sine-wave pattern, such as described in U.S. patent application Ser. No. 09/350,037, entitled "MACHINE-VISION SYSTEM AND METHOD HAVING A SINE-WAVE PROJECTION PATTERN", filed Jul. 8, 1999 and incorporated by reference. Such patterns are difficult and costly to generate with precision. They also typically have less contrast and less light transmitted in the pattern than is desired.

To overcome the problems stated above as well as other problems, there is a need for an improved machine-vision system and more specifically for a mechanical apparatus and method for inspecting manufactured parts such as disk-drive suspensions, and for determining various heights, dimensions, and angles of the parts.

SUMMARY OF THE INVENTION

In the context of a machine-vision system for inspecting a part, this invention includes method and apparatus to provide high-speed 3D (three-dimensional) inspection of manufactured parts. A binary pattern of opaque and clear stripes of different widths is used to generate a pattern that, at the object, approximates a sine-wave pattern to excellent precision and accuracy.

The invention provides a method, a grating, and a 3D imaging system using a binary grating in the projection system to generate patterned light. The grating includes a binary grating having a cycle pattern, wherein each cycle includes a first substantially clear stripe of a first width and a first substantially opaque stripe of substantially the same first width, and between the first substantially clear stripe and the first substantially opaque stripe are a second substantially opaque stripe of a second width narrower than the first width, and a second substantially clear stripe of substantially the second width. In some embodiments, a plurality of alternating narrow clear and opaque stripes are positioned between the relatively wider first substantially clear stripe and first substantially opaque stripe, in order that the optics of the projection optical system and the relative motion between the projection light pattern and the imaging time (trapezoidal integration) smooth the resulting pattern to provide a linear sine-wave-like pattern of projection light.

BRIEF DESCRIPTION OF THE DRAWINGS

FIG. 8C shows a simplified isometric front view of an embodiment of the present invention, 3D scanner head 802.

FIG. 9A shows a front view diagram of an embodiment of the present invention, 3D scanner head 900.

FIG. 9B shows a right-side view diagram of the 3D scanner head 900 of FIG. 11A.

DETAILED DESCRIPTION OF THE PREFERRED EMBODIMENT

Figure 1:
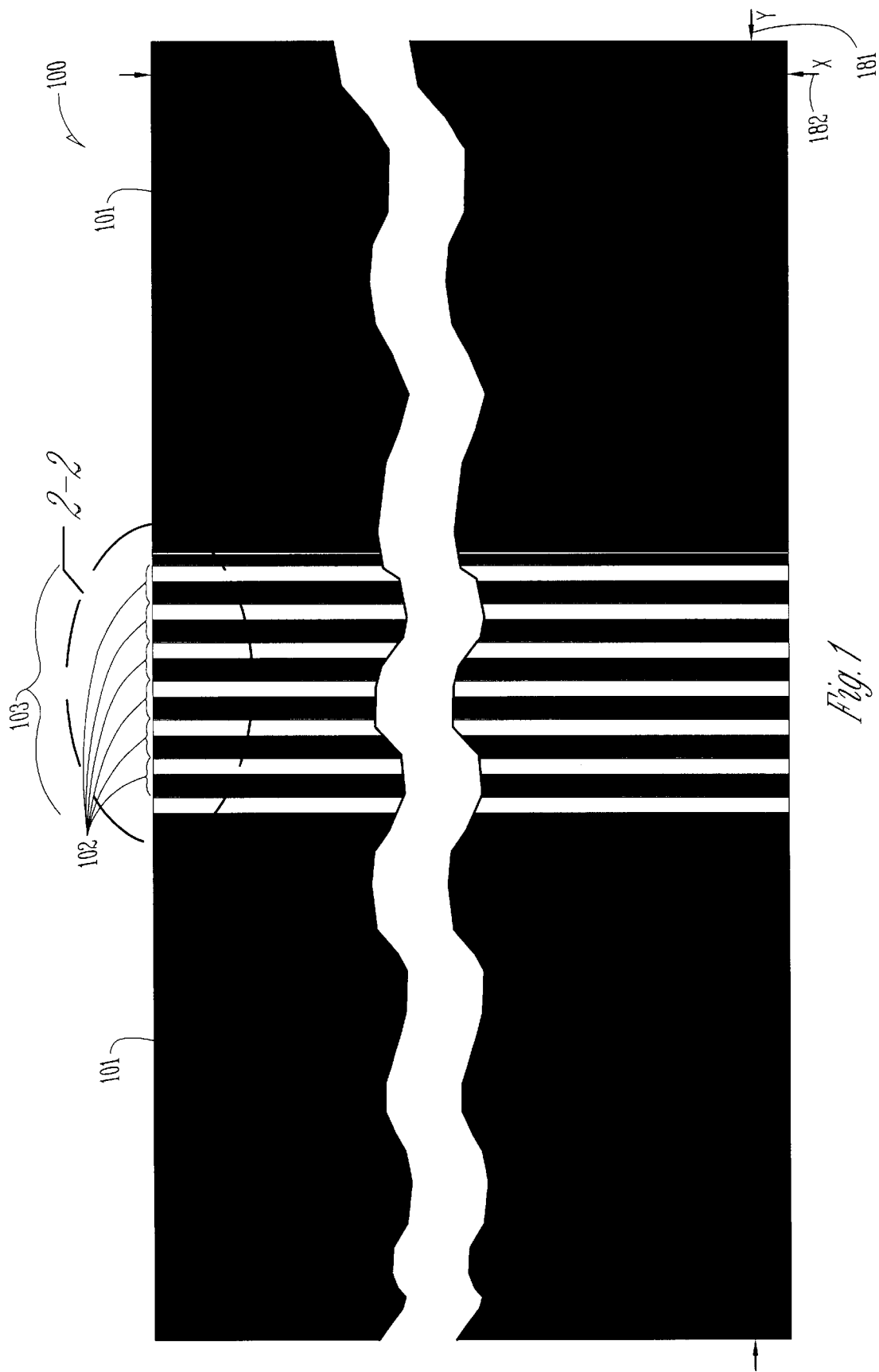
FIG. 1 shows a top view an embodiment of the present invention, a binary grating 100 for projection of patterned light for the manufacture and inspection of devices.

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Machine-vision and optical-feature-recognition techniques can be used to distinguish parts that deviate from a predetermined intended aspect of an ideal device. In this description, a "device" is meant to be any device of manufacture or object, for example an integrated circuit package, electronic part, semiconductor, molded plastic part, aluminum wheel, gemstone or even an egg or strawberry, which can be inspected. Typically, according to the present invention, a manufacturing operation will use two-dimensional and three-dimensional information, along with measured angles of respective portions of the parts acquired from inspection of the device to distinguish "good" parts from "bad" parts, and can discard the bad parts and insert previously inspected good parts in their place. In some embodiments, the devices under test are placed into pocketed trays or into cartons for ease of handling and transport, and inspection will take place of the devices while the devices are in the pocketed trays, according to the present invention. In other embodiments, a parts holder having a clamping mechanism is used to hold a plurality of parts such as disk suspensions.

U.S. Pat. No. 5,646,733 to Bieman (incorporated herein by reference) describes a method and system that include an optical head which is moved relative to an object at a machine-vision station. A projected pattern of light (e.g., a pattern of stripes or lines) is scanned across the surface of an object to be inspected to generate an imagable light signal to acquire three-dimensional information associated with the object. The optical head includes at least one pattern projector which projects a pattern of lines, and an imaging subsystem which includes a trilinear-array camera as a detector. The camera and the at least one pattern projector are maintained in fixed relation to each other. The trilinear-array camera includes three linear detector elements, each having, for example, about 1,000 to 4,000 pixels, which extend in a direction parallel with the pattern of lines. The geometry of the optical head is arranged in such a way that each linear detector element picks up a different phase in the line pattern. As the optical head is scanned across the surface of interest, the detector elements are continuously read out. Depth at each point on the surface is calculated from the intensity readings obtained from each of the detector elements that correspond to the same point on the surface. In this way, the phases of the pattern are calculated from the three intensity readings obtained for each point.

As described herein, the term "light" is meant to encompass any electromagnetic radiation including visible, infrared, and/or ultraviolet wavelengths, whether or not it is polarized, monochromatic, coherent, or modulated. Some embodiments use monochromatic light, while other embodiments use light having a range of wavelengths. Some embodiments use coherent light such as from a laser source. Some embodiments use polarized light, while others do not. Some embodiments used light whose intensity varies with time (such as pulsed light illumination to freeze motion), while other embodiments use DC light.

System Overview

FIG. 1 shows a top view an embodiment of the present invention, a binary grating 100 for projection of patterned light for the manufacture and inspection of devices. The left and right outer portions 101 of binary grating 100 are substantially opaque to the light being projected. In the center of grating 100 in some embodiments, are seven cycles 103 of a repeated pattern 102 of clear and opaque stripes, as shown. In some embodiments, photo-lithographic methods such as are in common use to make integrated circuits are used to pattern an opaque coating on a transparent substrate, such as by providing a photo-resist pattern to define where to etch a metal (e.g., chrome) layer on a glass substrate, in order to produce grating 100. The X-direction 182 is parallel to long axis of the imaging elements of the imager 823 (see FIG. 8C). In some embodiments, the Y-direction 181 is horizontal, parallel to the direction of relative motion between the objects being measured and the imager head, in order to satisfy Scheimpflug's condition.

Figure 2:
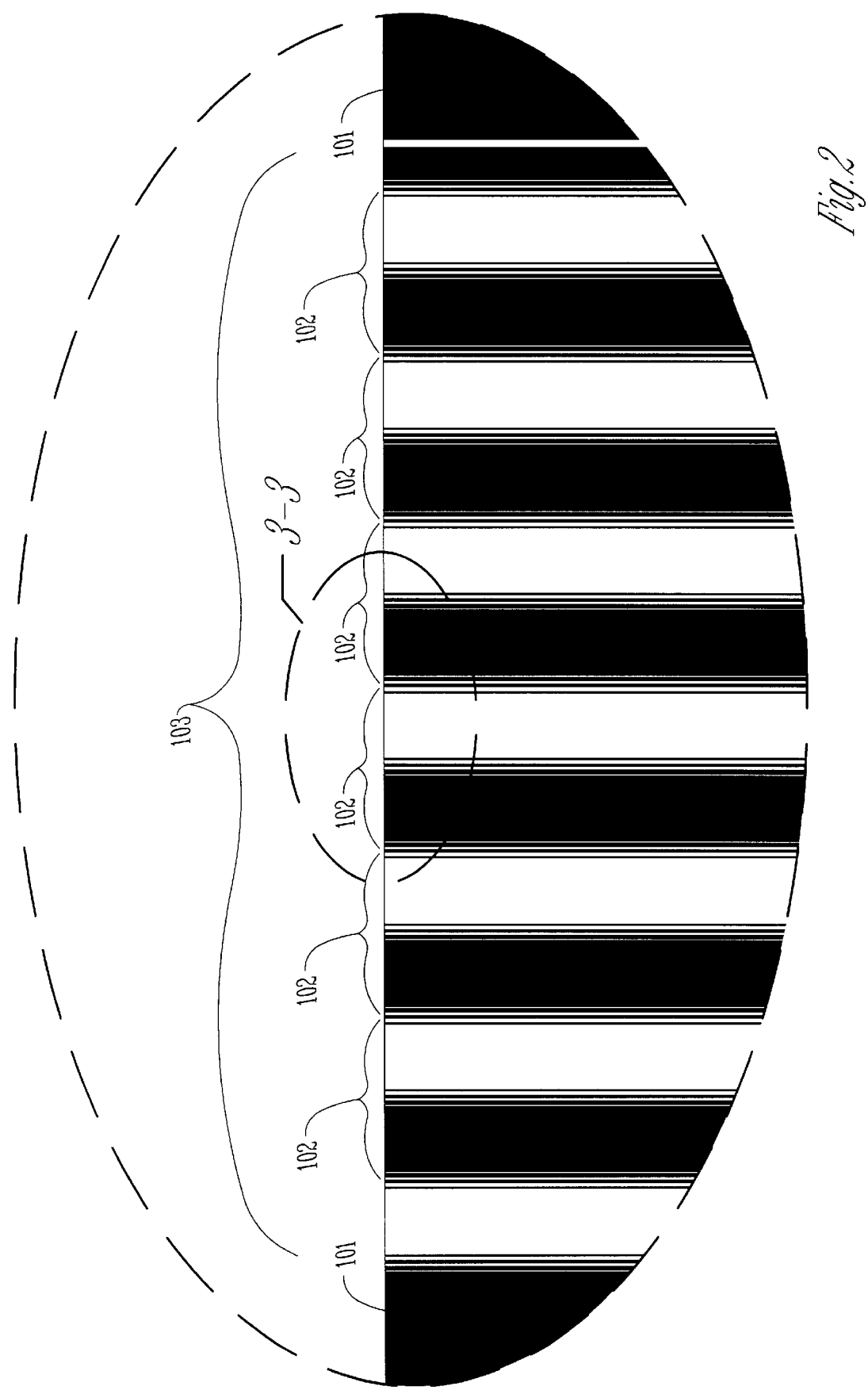
FIG. 2 shows a more-detailed top view of binary grating 100.

FIG. 2 shows a more-detailed top view of binary grating 100, showing details (of section 2—2 of FIG. 1) of the seven cycles 103 of a repeated pattern 102.

Figure 3:
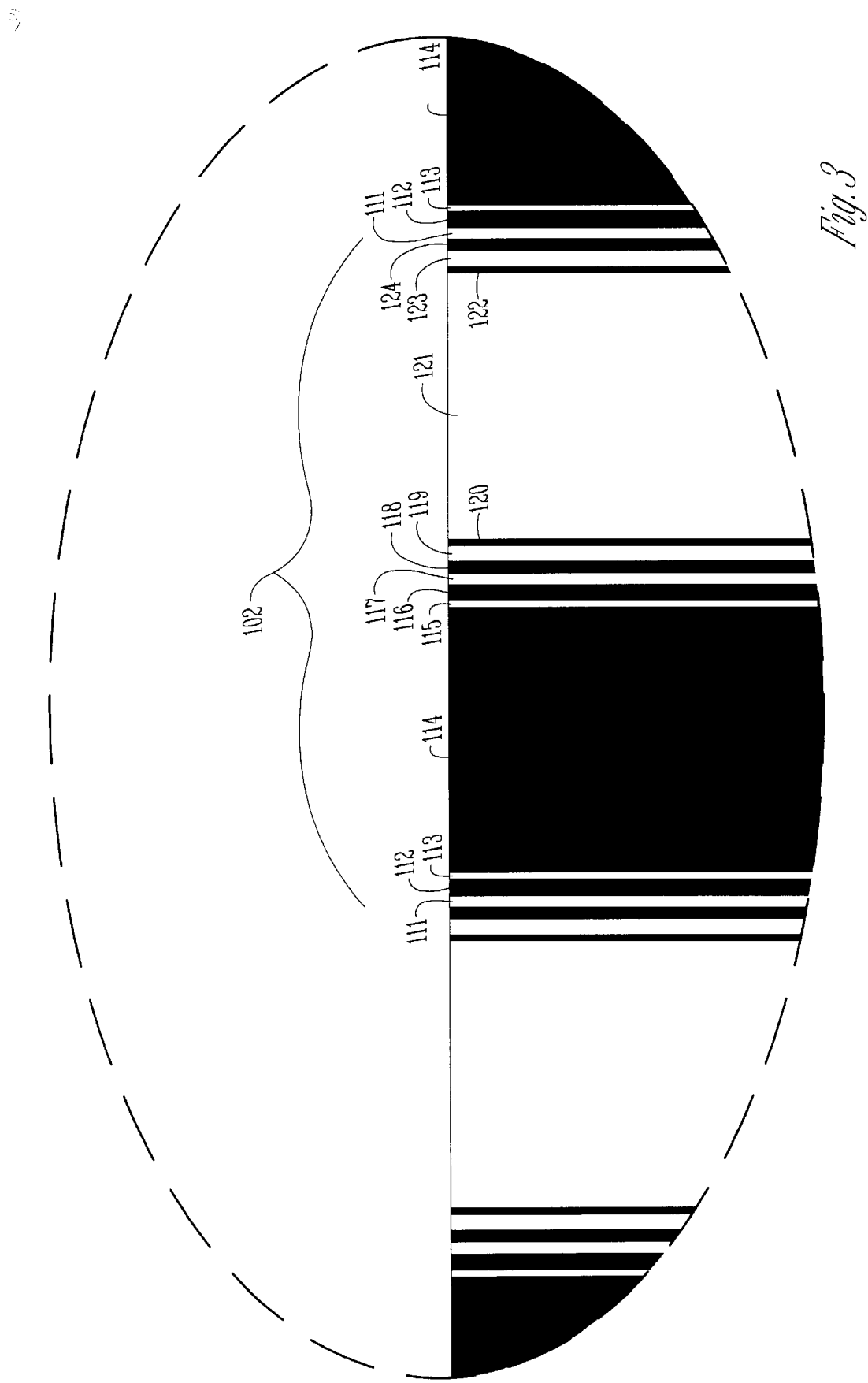
FIG. 3 shows an even-more-detailed top view of binary grating 100.
Figure 21:
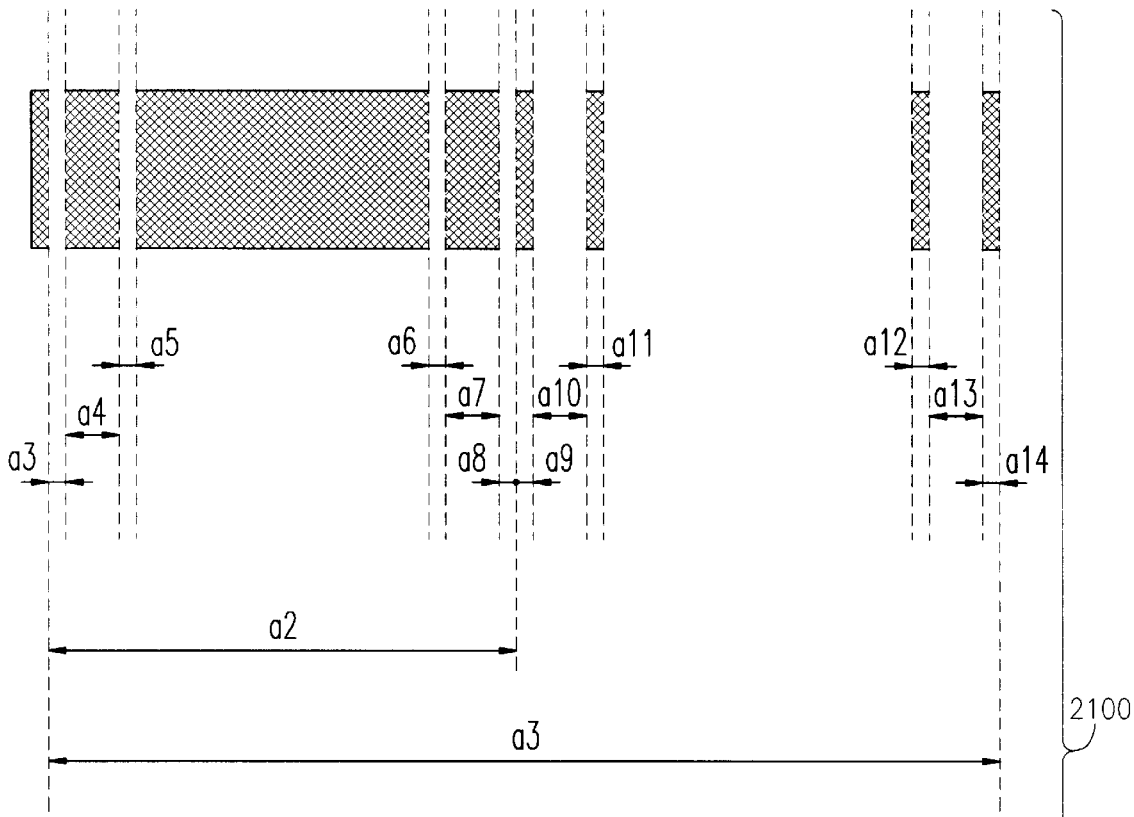
FIG. 21 shows a configuration 2100 of one cycle 102 of a grating.

FIG. 3 shows an even-more-detailed top view (of section 3—3 of FIG. 2) of binary grating 100. In some embodiments, this grating is defined by three parameters, x1=1.25 rad; x2=1.30 rad; and x3=1.464 rad (wherein the distance from the center of stripe 121 to the boundary between stripe 124 and 111 is defined as pi/2 radians (rad) of the two-pi cycle, see the description for FIG. 12 and FIG. 21, below). In the embodiment shown, each cycle 102 includes a relatively large clear stripe 121 and a relatively large opaque stripe 114 that are the same width (in the embodiment shown, two times x1 radians wide). Adjacent to each clear stripe 121 are opaque stripes 120 and 122, each being x2−x1 radians wide, and adjacent to each opaque stripe 114 are clear stripes 113 and 115, each also being x2−x1 radians wide. Adjacent to opaque stripe 120 is clear stripe 119, adjacent to opaque stripe 122 is clear stripe 123, adjacent to clear stripe 113 is opaque stripe 112, and adjacent to clear stripe 115 is opaque stripe 116, wherein stripes 119, 123, 112, and 116 are each x3−x2 radians wide. Adjacent to opaque stripe 116 is clear stripe 117, and between clear stripe 117 and clear stripe 119 is opaque stripe 118, and adjacent to opaque stripe 112 is clear stripe 111, and between clear stripe 111 and clear stripe 123 is opaque stripe 124, wherein stripes 117, 118, 124, and 111 are each pi/2−x3 radians wide. FIG. 21 shows one such embodiment, showing tolerances to achieve desired accuracy of that one embodiment.

Figure 4:
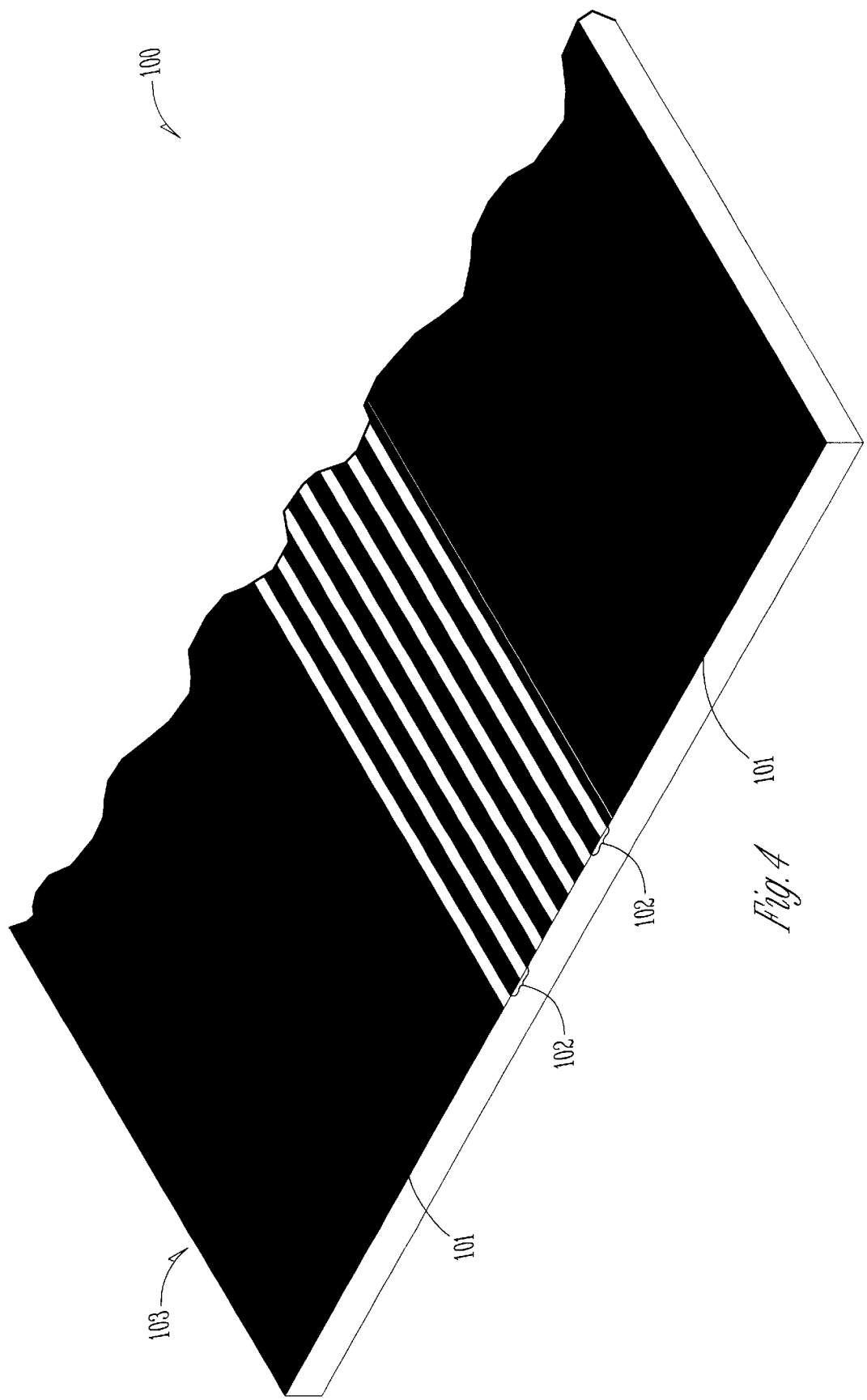
FIG. 4 shows an isometric view of binary grating 100.

FIG. 4 shows an isometric view of binary grating 100. In the embodiment shown, the pattern of stripes 103 extends the entire width (X-dimension direction) of grating 100.

Figure 5:
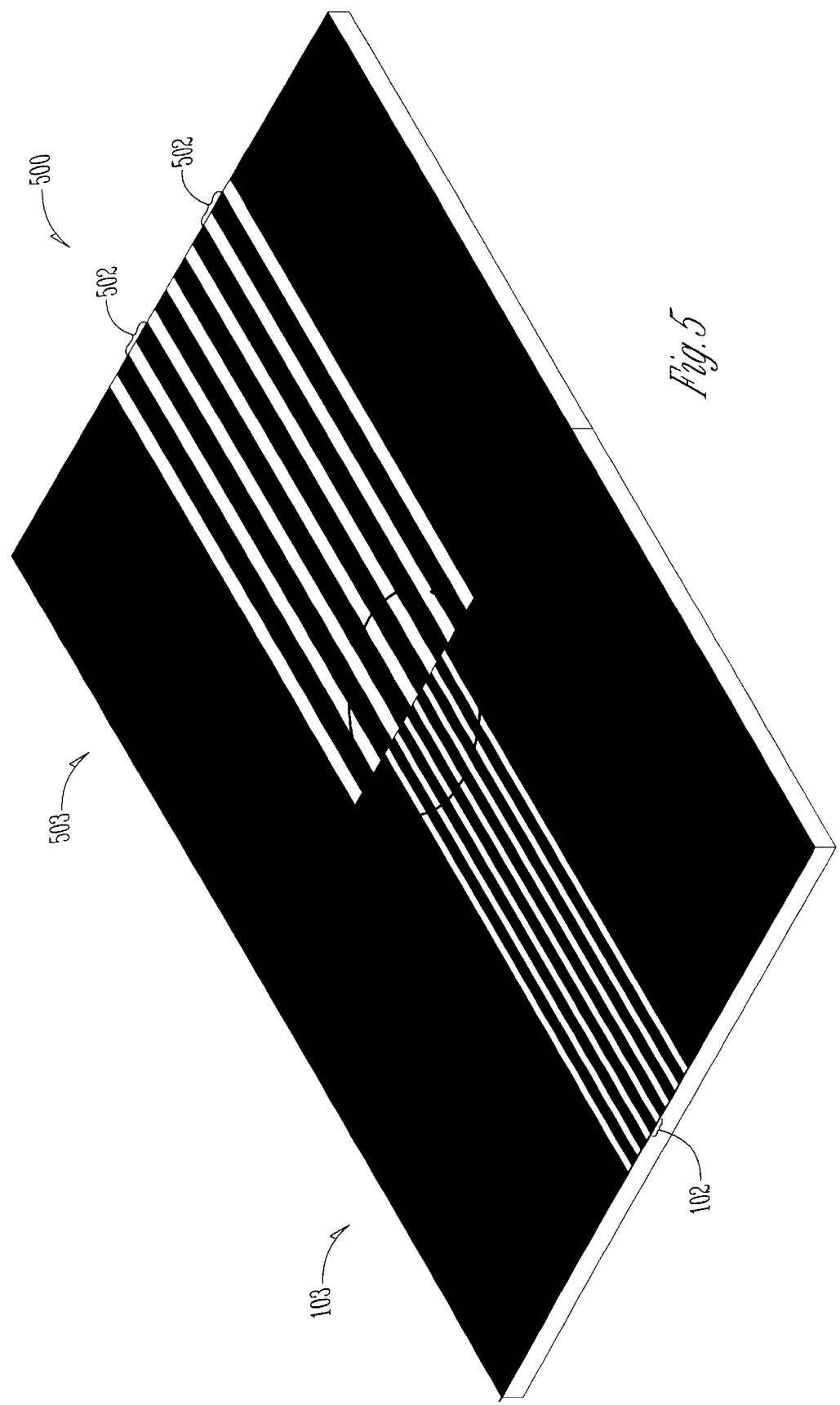
FIG. 5 shows an isometric view of a dual-resolution binary grating 500.

FIG. 5 shows an isometric view of a dual-resolution binary grating 500. In the embodiment shown, a fine-resolution grating pattern 103 (as described above) extends half the width of grating 500, and a medium-resolution grating pattern 503 extends across the other half of the width. Each element of each cycle 502 of coarse-resolution grating pattern 503 is twice the width of the corresponding element of fine-resolution grating pattern 103, and the center of fine-resolution grating pattern 103 (the center of the centermost wide clear stripe 121) aligns with the center of coarse-resolution grating pattern 503. This arrangement allows disambiguation of phase wrap in some measurements. In some embodiments of grating 100 (i.e., of FIG. 1), each measurement allows a measurement granularity of 256 heights within each cycle of the projection pattern light, but cannot determine which cycle is being used for the measurements. Phase wrap occurs when the height values greater than 255 of one cycle are read as starting with zero of the next cycle. By using grating 500 and measuring the same feature with both pattern 103 on one pass of the scanning head, and then measuring the same feature with pattern 503 on another pass of the scanning head, one can determine whether the feature is on an even cycle or an odd cycle of pattern 103. In some embodiments, two scans are performed across the objects 99 being measured, one using pattern 503 and one using pattern 103. This provides five-hundred twelve measurable heights within each cycle of pattern 503, and removes every other phase wrap of pattern 103.

Figure 6:
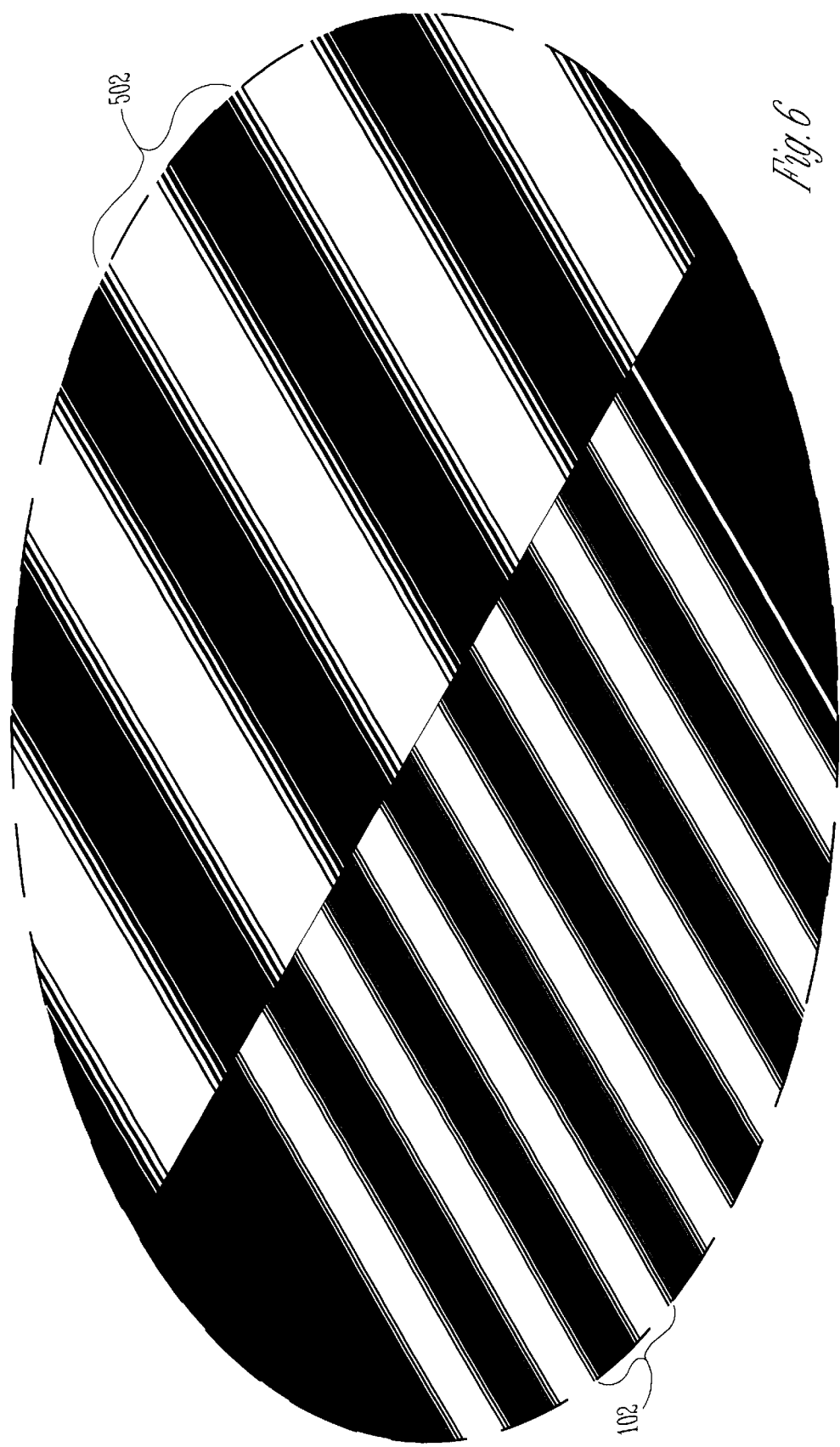
FIG. 6 shows a more-detailed top view of dual-resolution binary grating 500.

FIG. 6 shows a more-detailed top view of dual-resolution binary grating 500, showing the intersection of pattern 103 and pattern 503.

Figure 7:
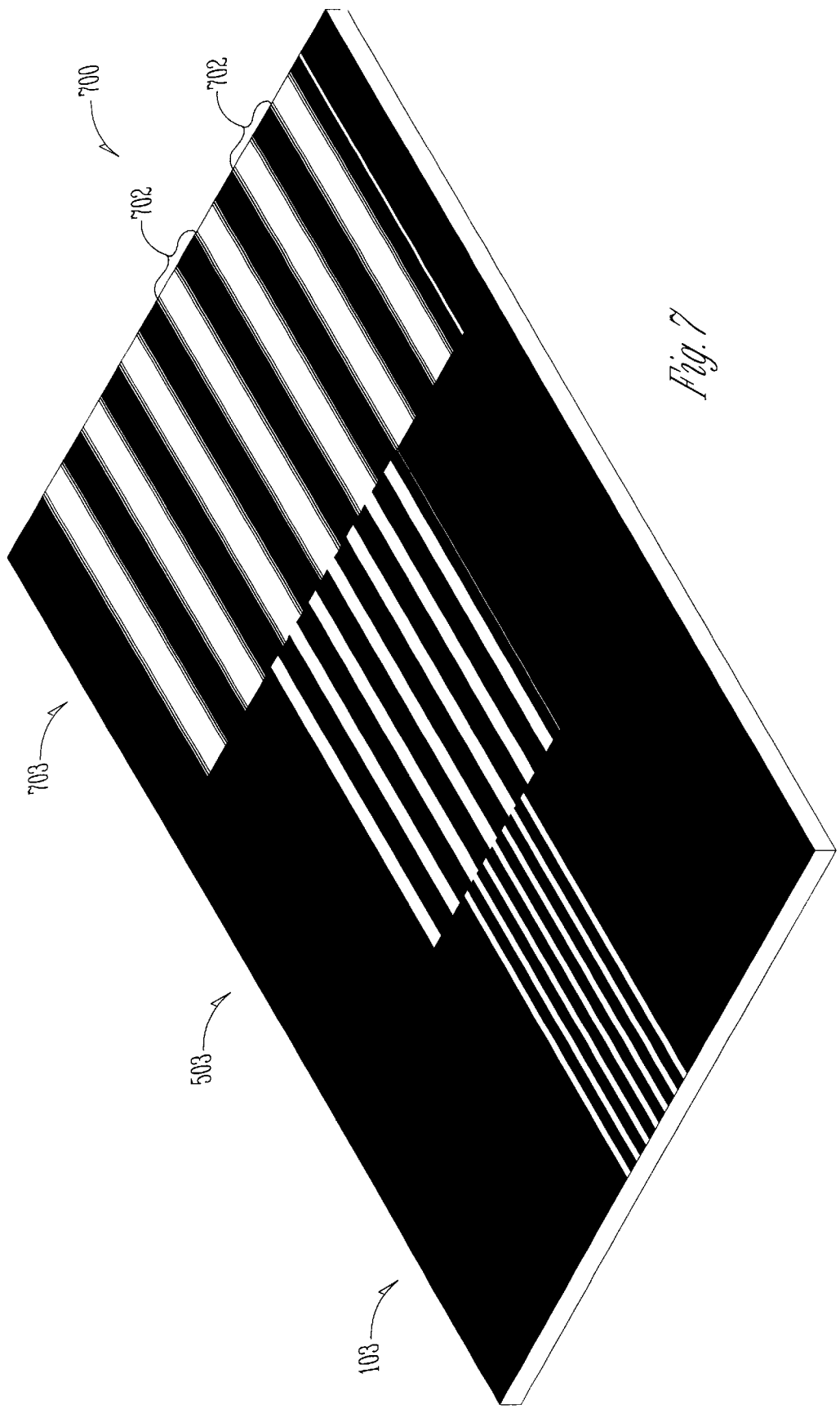
FIG. 7 shows an isometric view of a triple-resolution binary grating 700.

FIG. 7 shows an isometric view of a triple-resolution binary grating 700. In the embodiment shown, coarse-resolution grating pattern 503 extends for a third of the width of grating 700, medium-resolution grating pattern 503 extends across one third of the width, and fine-resolution grating pattern 103 (as described above) extends across one-third the width of grating. In some embodiments, three scans are performed across the objects 99 being measured, one using pattern 703, one using pattern 503, and one using patternm103. This removes every other phase wrap of pattern 503, and thus three of four phase wraps of pattern 103. In other embodiments, yet more patterns are added to further remove phase wraps. In some embodiments, grating 700 is moved sideways between each scan, such that only one pattern chosen from pattern 703, pattern 503 or pattern 103 is projected during one scan, but the projector relative to the objects remains in one X-direction position such that the same features are scanned in all three scans. In other embodiments, the entire width of grating 700 is projected for all three scans (and the entire width is imaged into the CCD array), wherein the projector is moved ⅓ of the width of grating 700 between each scan. Thus, on the first pass, the feature is illuminated by pattern 703 and imaged to a first third of the CCD array; on the second pass, the same feature is illuminated by pattern 503 and imaged to a second third of the CCD array; and on the second pass, the same feature is illuminated by pattern 103 and imaged to a last third of the CCD array.

Figure 8A:
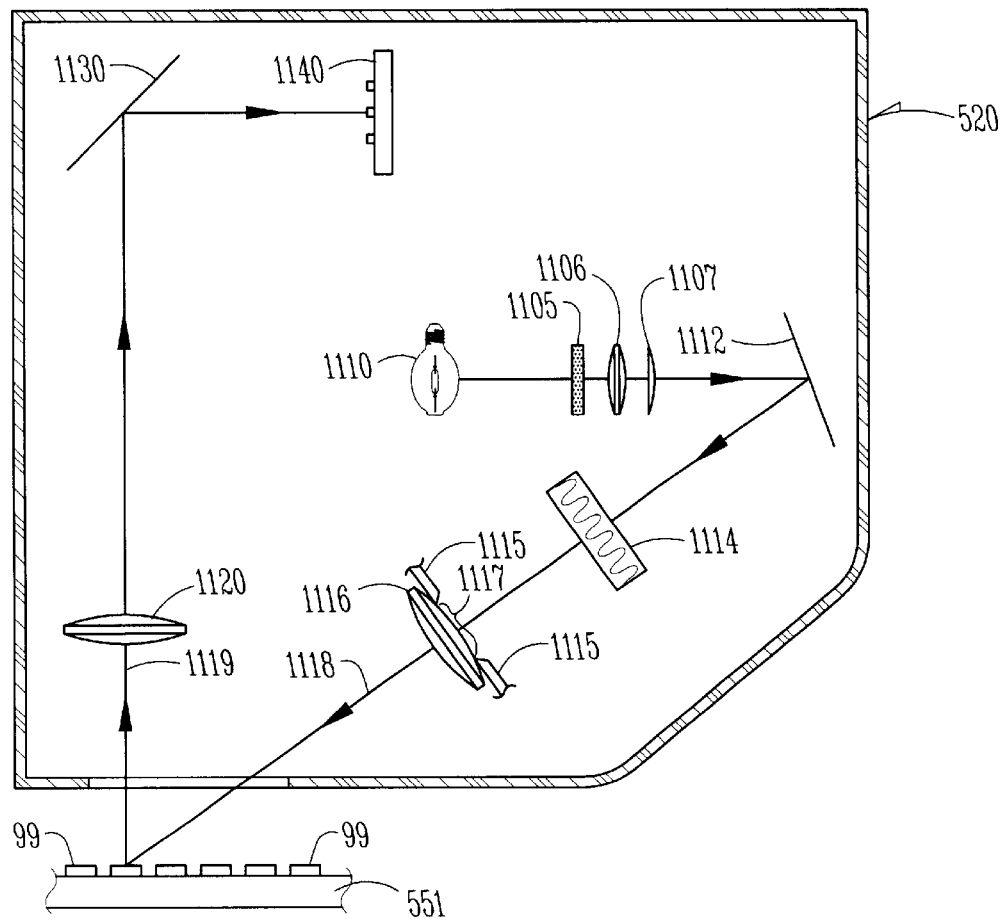
FIG. 8A shows a schematic view of an embodiment of the present invention, imager head 800.

FIG. 8A shows a schematic view of an embodiment of the present invention, imager head 800. In the embodiment shown, light from lamp 1110 reflects from mirror 1112, through grating 1114 and telecentric projection lens 1116, and then onto objects 99 being scanned. In some embodiments, objects 99 are placed in a tray or attached to a clamping fixture mounted to or placed on table 551. Scan head 520 is then scanned in a left-to-right or right-to left motion with the parts motionless: during the scan, to minimize vibration that would lead to inaccuracies in the 3D measurement. In some embodiments, the reflected light from objects 99 passes through imaging lens 1120, reflects off mirror 1130, and is focussed onto tri-linear imaging CCD 1140. Mirrors 1112 and 1130 help to substantially reduce both the size and weight of scan head (thus reducing the vibration of the moving head and tightening tolerances of the various adjustments made to make the scan path parallel and true), allowing more precise measurements of very small parts and 3D variations of parts.

In some embodiments, the projection light path 1118 includes diffuser 1105, filament lens 1106 and/or cylindrical lens 1107. The long axis of the filament of lamp 1110 and the long axis of the cylindrical lens 1107 are parallel to one another and perpendicular to the plane of the drawing sheet. In some embodiments, diffuser 1105 is a low-loss holographic diffuser (such as available from Edmund Scientific, 101 East Gloucester Pike, Barrington, N.J./USA 08007-1380; part number J54-493), used to enlarge the apparent size of the filament, and together with cylindrical lens 1107, help to uniformly fill aperture 1117 of lens 1116. In some embodiments, a holographic diffuser 1105 is used that has a small amount of dispersion in the up-down direction, and a large amount of dispersion side-to-side, in order to uniformly elongated aperture 1117. In some embodiments, this configuration is designed to fill the elongated aperture 1117 of projection lens 1116, which helps to faithfully reproduce the grating 1114, i.e., all stripes are illuminated the same, and each stripe is illuminated the same for its entire length. Such uniform dispersion provides a more accurate projection pattern, an thus more accurate measurements. In some embodiments, projection lens 1116 is a doubly-telecentric lens set having a unity magnification, and having an elongated aperture stop at the common focal point between the lenses of the doubly-telecentric lens set. In some embodiments, a mask 1115 defines a rectangular elongated aperture 1117 that is longer in a long dimension perpendicular to the drawing sheet than in a width dimension parallel to the drawing sheet.

In one embodiment, a design goal is to obtain a sharp contrast over a depth of about two millimeters in the Z-direction (i.e., the projected image of the grating is to remain substantially in focus over a depth of about 2 mm in the height direction of the object being measured), yet to obtain a projection-lens speed of F/6 or faster in order to satisfy radiometric requirements of the system (to obtain enough light to the CCD imager). If a circular projection aperture is used, a system F/number would need to be about F/10.4 to obtain the needed depth of focus, however this would be to small an aperture to obtain enough light to satisfy radiometric requirements. By using an elongated aperture that is shortened in the Y-Z plane to obtain a large enough F/number to obtain a sharp focus over two millimeters to meet an MTF (modulation transfer function) goal of 70%, yet elongated in the X-Z plane to obtain enough light. In some embodiments, the aperture is narrowed by a factor of two in one direction and elongated by a factor of two in the perpendicular direction.

Figure 8B:
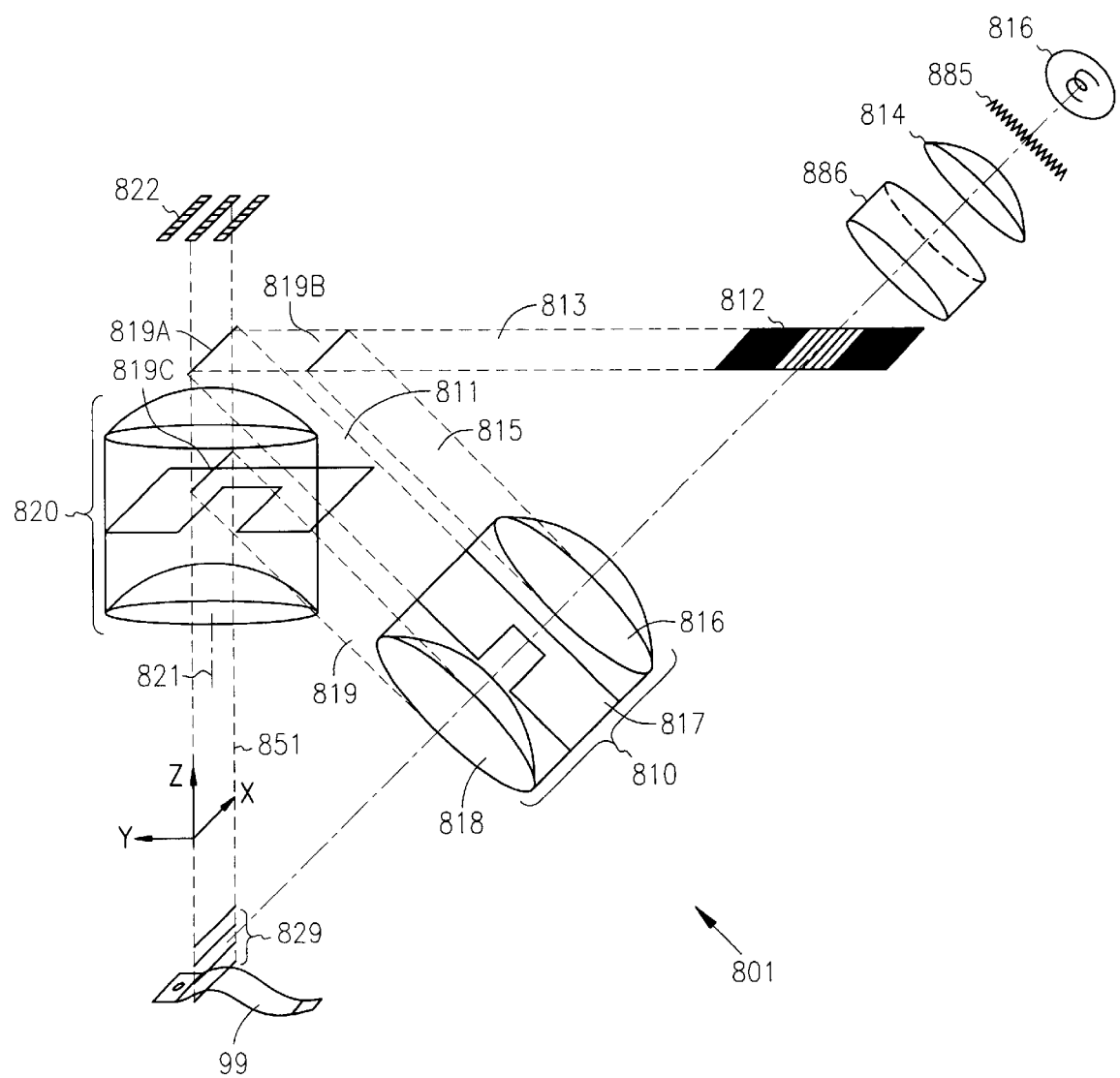
FIG. 8B shows a front view diagram of an embodiment of the present invention, 3D scanner head 801, showing the Scheimpflug condition.

FIG. 8B shows a front view diagram of an embodiment of the present invention, 3D scanner head 801, showing the Scheimpflug condition. Elongated filament 816 of lamp 818 emits light along projection optical axis 811. The light passes through holographic diffuser 885, focusing lens 814, and cylindrical lens 886, each of which is designed to focus the light to uniformly fill the aperture of projection lens 810, as defined by elongated aperture stop 817 in the middle of lens 810. Binary grating 812 is located in a horizontal plane 813. In some embodiments, the opaque areas 101 of grating 812 are covered with a black-silk coating on the side facing lens 810 to reduce stray light. In some embodiments, telecentric lens 810 is a doubly telecentric lens having an object-side principal plane 815 (of the object-side lens(es) 816) and an image-side principal plane 819 (of the image-side lens(es) 818). In the embodiment shown, telecentric lens 810 has unity magnification, and thus plane 815 and plane 183 intersect at line 819B, plane 819 and plane 851 (the imaging plane centered on imaging axis 821) intersect at line 819C, and lines 819B and 819C are both at the same distance from projection axis 811. This allows the lenses and aperture stop of lens 810 all to be perpendicular to the projection axis 811, and also to eliminate keystone distortion. In some embodiments, a telecentric imaging lens 820 is used. In some embodiments, the projection axis 811 is at a 45-degree angle to both plane 851 and plane 813. The object 99 is thus illuminated by stripes of light 829 in the vertical XZ plane, wherein these stripes are at three different heights for the three imaging stripes of CCD imager device 822.

In some embodiments, a Scheimpflug condition is satisfied for the projection lens 810 that the intersection line 819B of the grating (object) plane with the grating (object)-side principal plane 815 of the projection lens is to be at the same distance from the axis of the projection lens as is the intersection 819C of the X-Z (image) plane and the image-side principal plane 819 of the projection lens. With a unity-magnification doubly-telecentric projection lens 810 oriented with its axis at a 45-degree angle to the height direction being measured (i.e., the X-Z plane) the Scheimpflug condition can be met by having the grating 812 oriented in the Y-Z plane (i.e., at the complementary 45-degree angle to the projection axis). Thus, the plane 811 of aperture stop 817, the plane 813 of grating 812, and the plane 851 of the X-Z volume being measured all intersect at line 819 for such a unity-magnification doubly-telecentric projection lens.

FIG. 8C shows another embodiment having scanning head 802. Filament 816 of lamp 818 is elongated in a horizontal direction 806. Holographic diffuser 887 (such as available from Edmund Scientific, 101 East Gloucester Pike, Barrington, N.J./USA 08007-1380; part number J54-493) acts to widen the effective area of filament 816. Lens 814 and cylindrical lens 886 further act to image filament 816 (using effective distance ratio D3/D4 and the magnification of lens 814 and lens 886) to uniformly fill aperture 876 to enhance accuracy of the projected light, and thus of the resulting height measurements. In the embodiment shown, grating 812 having pattern 843 is at a normal angle 807 to projection axis 809, and is focussed to object 99 being measured (using effective distance ratio D1/D2 and the magnification of lens 810). In other embodiments, the Scheimpflug condition as described above is used. In the embodiment shown, object 99 as illuminated by projected patter 899 is focussed to the three imaging lines 823 of imager 822 (using effective distance ratio D5/D6 and the magnification of lens 820). Aperture 841 reduces stray light that might enter the imaging side.

Figure 27:
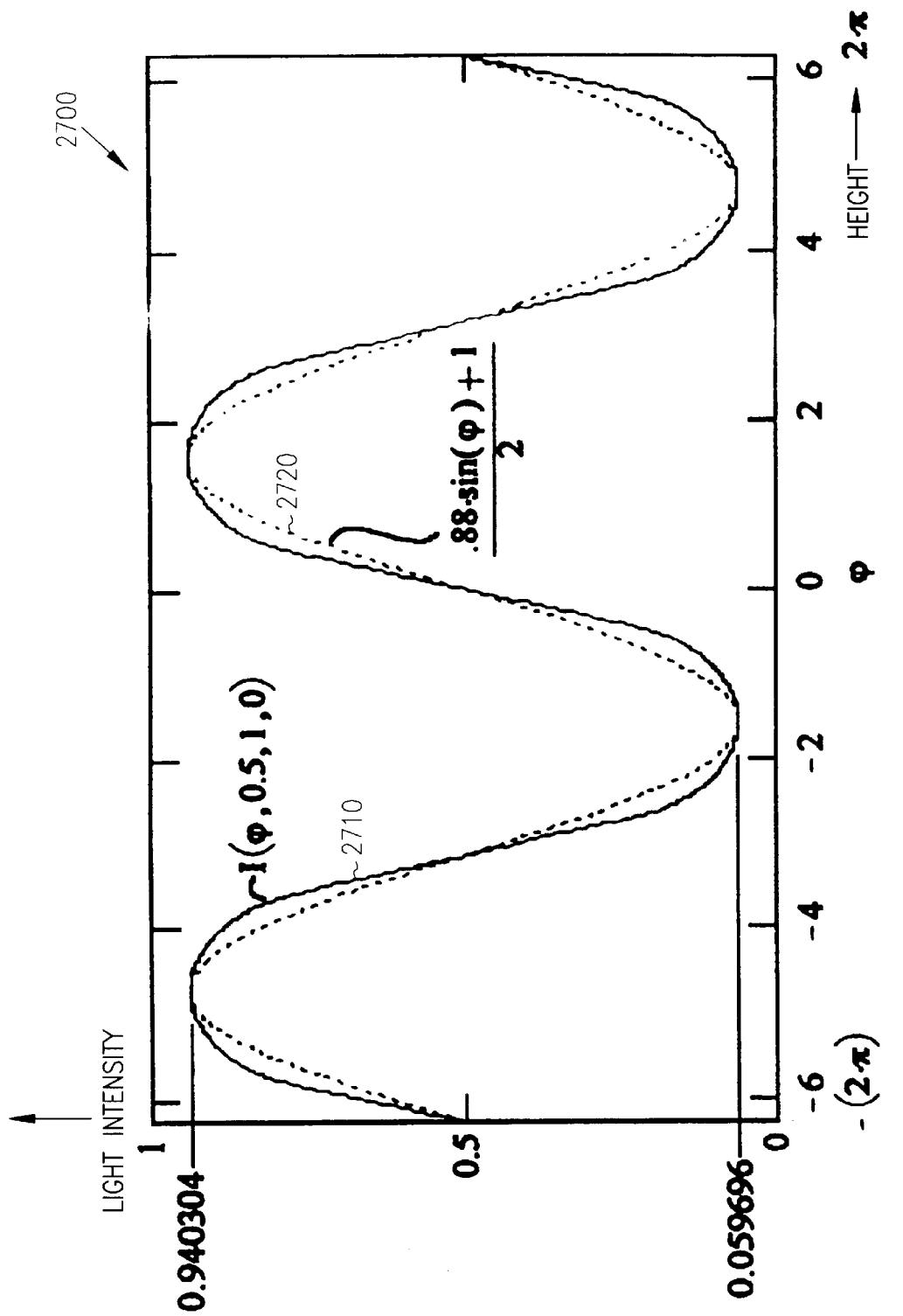
FIG. 27 shows a graph 2700 comparing the effective light pattern intensity 2710 to a sine wave 2720.

FIG. 9A shows a front view diagram of an embodiment of the present invention, 3D scanner head 900, and FIG. 9B shows a right-side view diagram of the 3D scanner head 900 of FIG. 11A. In the embodiment shown, the optical system is the same as shown in FIG. 8A, except the projection light passes through deflection prism 886, and the imaging light passes through periscope prism 887. The light 884 from filament 816 is focussed and diffused to fill the aperture of telecentric projection lens 810 having an elongated aperture 876. The image 898 of grating 812 provides a wide (in the X-direction) and deep (in the Z-direction) focussed pattern of stripes having a sine-wave like linear alternating pattern (see FIG. 27). In some embodiments, the imaged light is also restricted by an elongated aperture 877 in telecentric imaging lens 820.

Figure 10:
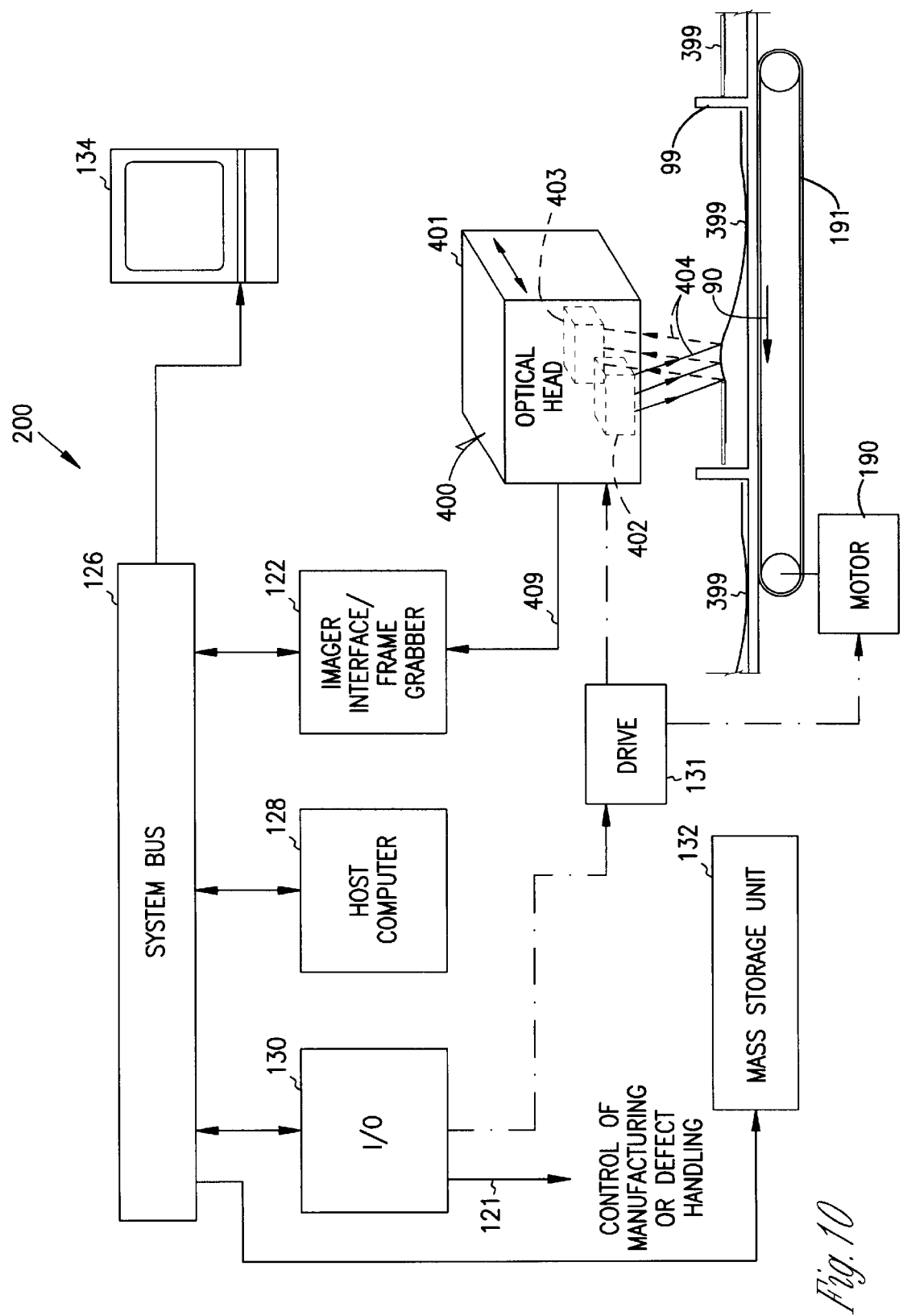
FIG. 10 shows an embodiment of the present invention, a computer-controlled system 200 for the control of the imaging operation and measurement functions.

FIG. 10 shows one exemplary embodiment of the present invention: a computer controlled system 200 for the control of the imaging operation and measurement functions of system 100. Host computer 128 is coupled through system bus 126 to mass storage unit 132 (e.g., a magnetic disk subsystem), input/output (I/O) subsystem 130, imager interface 122, and display 134. In one embodiment, imager interface 122 is coupled to an optical head 401 such as described in patent application Ser. No. 09/350,050, entitled "MACHINE-VISION SYSTEM AND METHOD FOR RANDOMLY LOCATED PARTS." In one embodiment, I/O subsystem 130 controls drive 131 which moves either optical head 401 or device 399 or both, in order to obtain a relative scanning motion between the two (one embodiment which scans a tray or clamp holding devices 399 keeps the tray stationary during the optical scanning operation, and moves only optical head 401, in order to eliminate movement of devices 99 within the tray due to vibration from the motors, and thereby obtain more accurate measurements). In one such embodiment, drive 131 moves head 401 to first scan one or more entire rows of devices 99 in a tray in a single pass in the Y direction, then increments the tray in the X direction, then performs a second scan of one or more entire rows of devices 99 in a single pass in the Y direction (parallel to, but in the opposite direction to the first scan), and repeats this until the entire tray of parts is measured. This method/apparatus provides high accuracy by constraining camera movement to a single direction (i.e., plus and minus Y), thus allowing tighter positional controls since the head-motion gantry does not need to be moved in the X direction (thus the X-position is fixed), and movement in the Z direction is only made to set the scan path to the proper depth position well before the scanning operation, and the Z position is left fixed after that. This provides a scan wherein there is no slop, backlash, vibration, or motion in the X and Z directions, and the scan in the Y direction can be made smooth and exact, thus providing more accuracy than other configurations.

Since each scan obtains data from a relatively wide scan stripe, there is no need to pre-align the parts (e.g., vibrate the tray to align the parts to one side of the tray pockets), or even necessarily to have tray pockets, although pockets are provided in one embodiment in order to facilitate other steps, such as pick-and-place operations to remove bad parts from trays and replace them with good parts. Imager interface 122 obtains raw scan data from optical head 401, and computes and stores processed data representative of the intensity and/or height of each X and Y coordinate of each device 99 (called "grabbing a frame"). Based on a comparison of the measured data to a predetermined set or range of acceptable or desired data, host computer 128 controls signal 121 through 10 subsystem 130. Signal 121 is used (in various embodiments) to control a step in the manufacturing process and/or to select a set of "all good" parts from among all parts produced.

In some embodiments, an elongated aperture is used in the projection lens, wherein the narrow dimension of the aperture extends the depth of focus of the projected grating and the wide dimension increases the light collection of the projection lens. In some embodiments, a telecentric projection lens is used, wherein the axis of the telecentric lens assembly is aligned with the projection axis (i.e., the plane of each lens element is normal to the projection axis). In some embodiments, the Scheimpflug configuration is used for the grating in conjunction with the telecentric projection lens. The Scheimpflug configuration significantly increases the depth of focus of the projected grating in the axis of the image lens. A telecentric lens helps to prevent changes in magnification of the projection lens over the depth of focus, which is referred to as keystone distortion.

The present invention provides a binary grating to generate sine-wave-like pattern for an SMI sensor. The following sections provide analyses and methods for designing binary gratings according to the present invention.

Configuration of the Binary Grating

Figure 11:
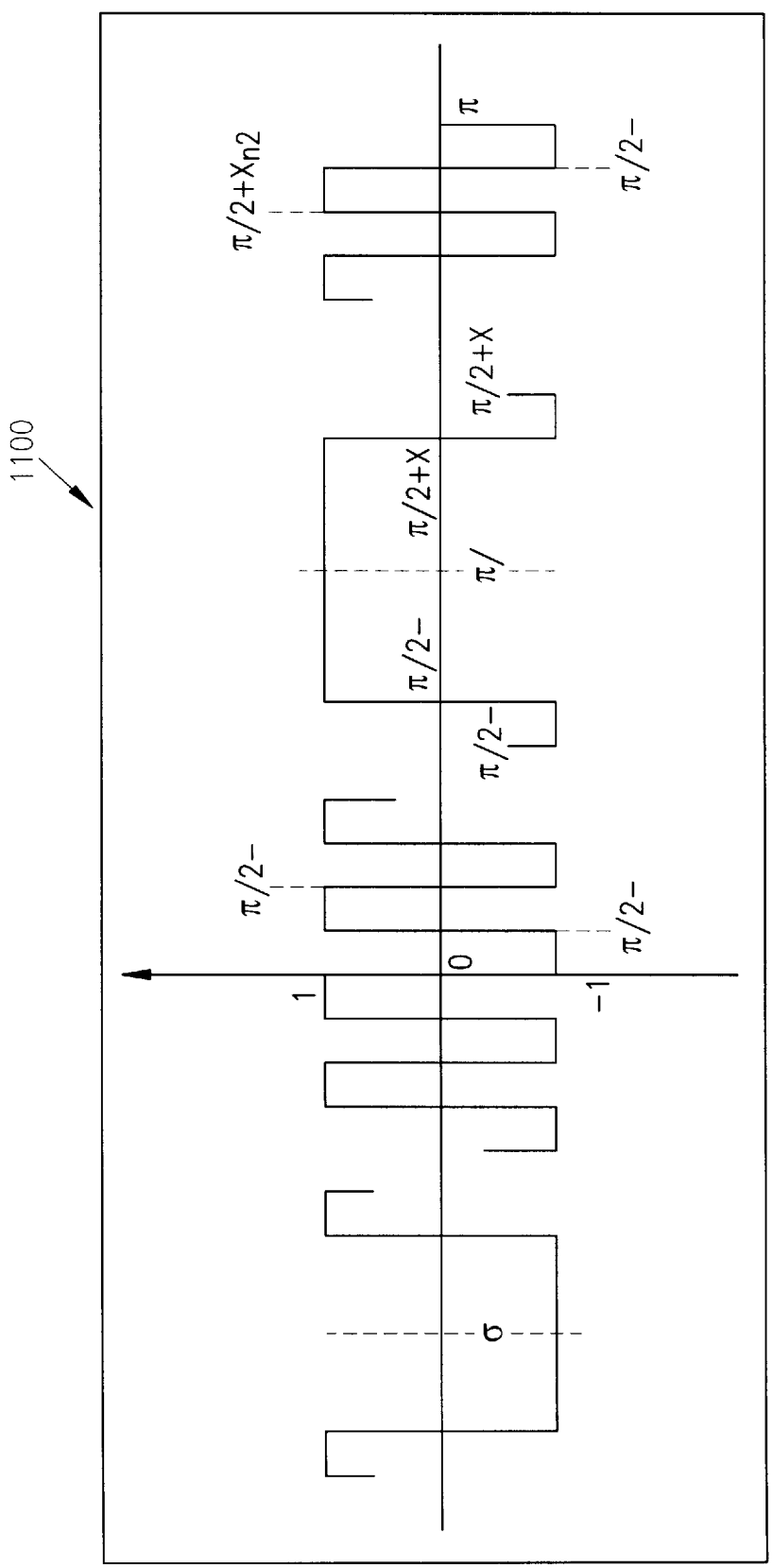
FIG. 11 shows a generalized binary grating 1100.

FIG. 11 shows the generalized grating with n parameters x1 . . . xn. For the convenience of further analysis, 0~1 binary grating (a grating having values of 0 and 1) is changed to −1~1 grating (a grating having values of −1 and 1) to get rid of the DC component.

Figure 12:
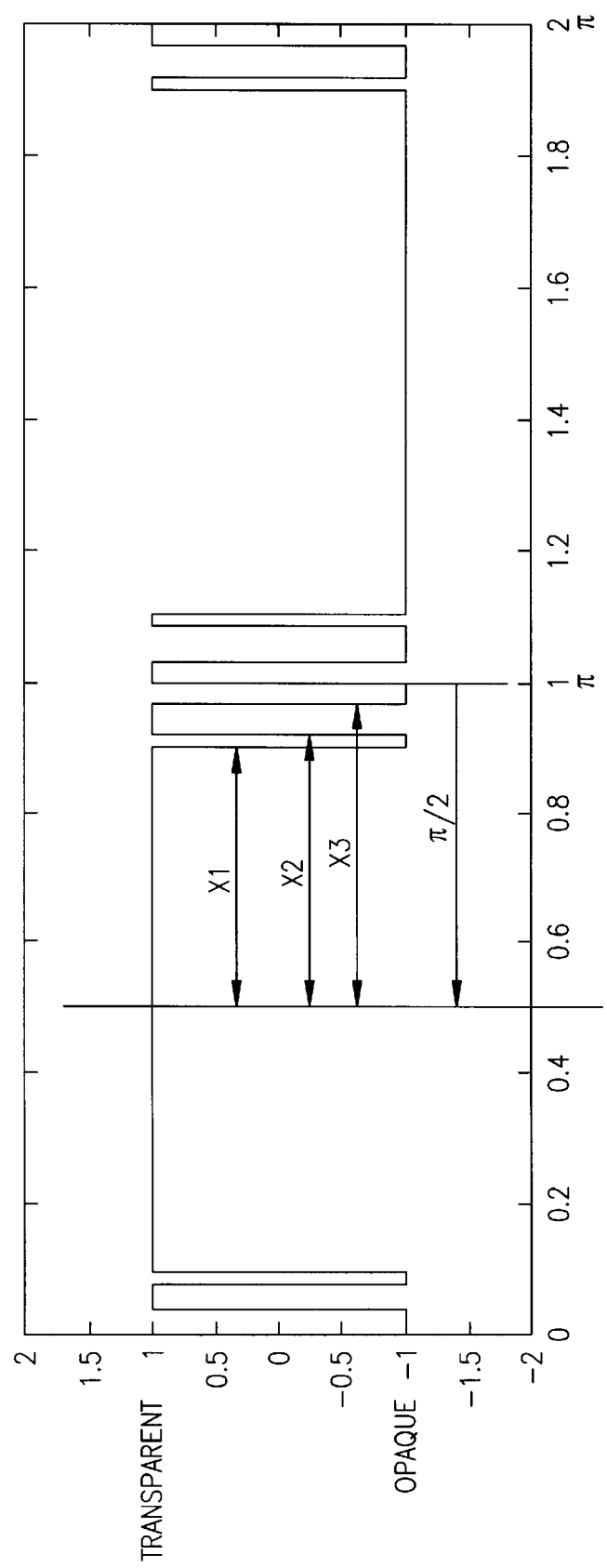
FIG. 12 shows a binary grating 1200 having three parameters x1, x2, and x3.

FIG. 12 shows one embodiment grating of the present invention that will be discussed below. There are three grating parameters: x1, x2, and x3.

Binary Grating's design and optimization

A Fourier analysis approach is used in this embodiment to design and evaluate the grating.

A binary grating signal, before received by camera, is low-pass filtered by the projection optics before it intersects the object being measured, the imaging optics after it leaves the object and the CCD sampling (both the area of the CCD pixel and the time integration of the sampling period).

Figure 13:
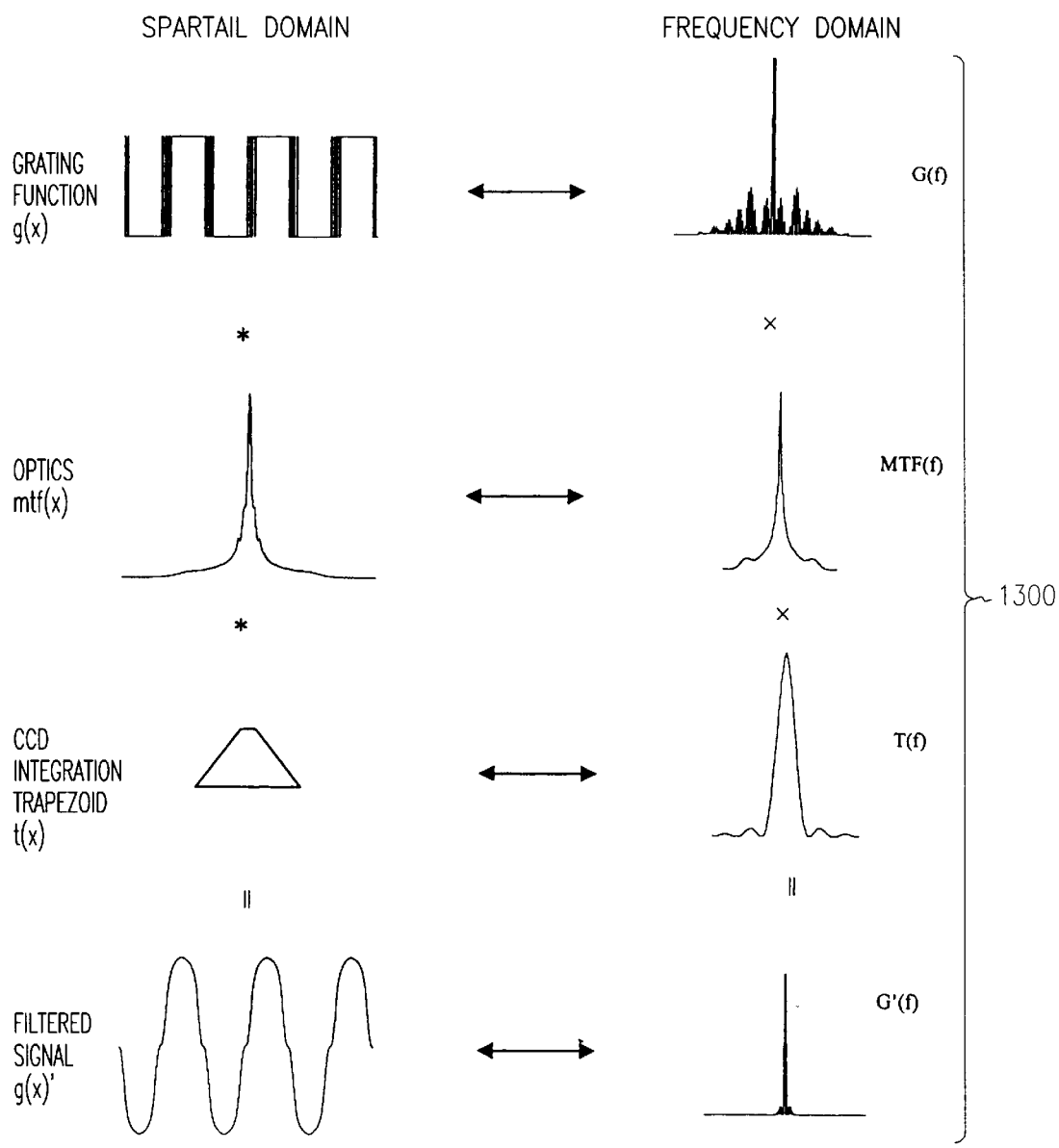
FIG. 13 shows a grating image distortion description 1300.
Figure 14:
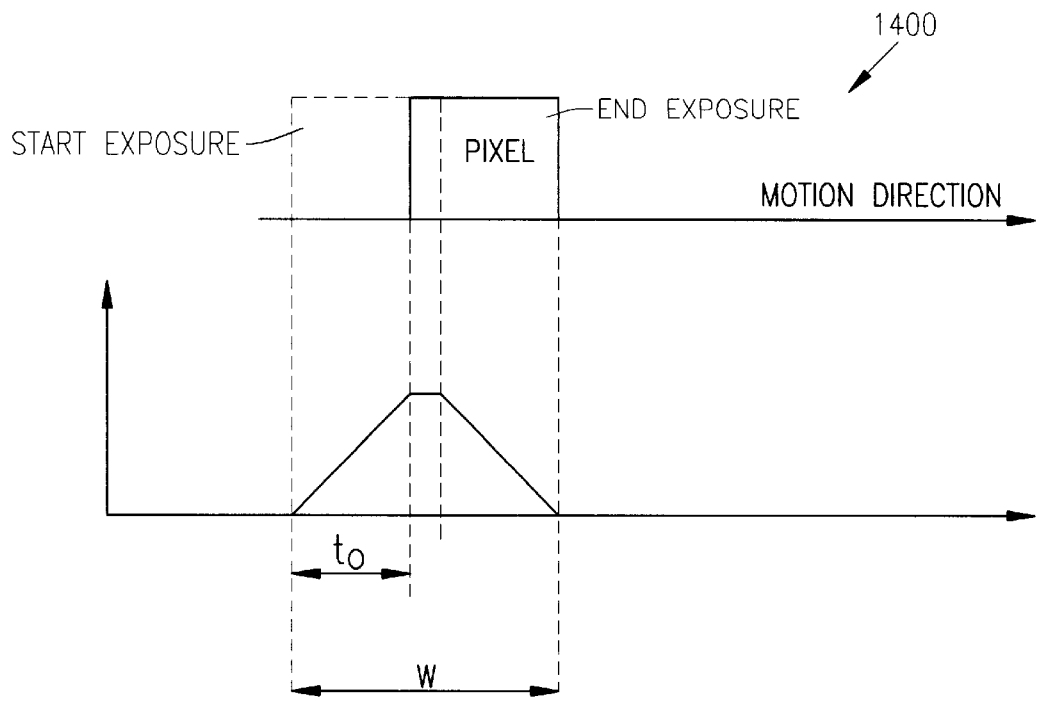
FIG. 14 shows a trapezoid convolution factor graph 1400.

FIG. 13 shows this filtering in both spatial domain and frequency domain. The grating g(x) is first convoluted by optics' mtf(x), (the modulation transfer function) decided by the optics. Then, it is further filtered by a trapezoid function t(x) that is caused by the motion and CCD exposure time (FIG. 14). In the corresponding frequency domain, the grating's frequency spectrum will be first modulated by optics' MTF(f) (modulation transfer function); and then further modulated by the trapezoid function's spectrum T(f). After modulated by MTF(f) and T(f), the high frequency components of the grating are filtered out. This "low-pass" filtering makes the grating image look more like a sine wave with the same frequency as the original grating.

The following Section derives the equations shown in FIG. 13, and looks at the binary grating's Fourier series.

From the above description and FIG. 13, the following presents the equation expression of the final grating image after the filtering:

In the spatial domain filtered grating image g'(x):

$$g'(x)=g(x)*mtf(x)*t(x) \quad (1)$$

In the frequency domain:

$$G'(f)=G(f)*MTF(f)*T(f) \qquad (2)$$

The Fourier series of the binary grating is g(x):

$$g(x) = \sum_{m=1}^{\infty} b_{2m-1} \sin((2m-1)x) \text{ where} \qquad (3)$$

$$b_{2m-1} = \frac{2}{(2m-1)\pi}\left\{-1 + 2\sum_{i=1}^{n-1}[\sin((2m-1)x_i) \times (-1)^{i-1}(-1)^m]\right\}$$

(see the derivation in Appendix 1, below) We simplify $b_{2m-1}$ by limiting the number of parameter n=4 as shown in FIG. 12.

$$b_{2m-1} = $$

$$\frac{2}{(2m-1)\pi}\{-1 + 2\times(-1)^{m-1}\times[\sin((2m-1)x_1) - \sin((2m-1)x_2) + \sin((2m-1)x_3)\} \ (m = 1, 2, 3...)$$

From equation (3), the Fourier transform of the original grating is:

$$G(f) = F(g(x)) = \sum_{m=1}^{\infty} b_{2m-1} \times \delta(f - (2m-1) \times f_0) \qquad (4)$$

where $f_0=1/T$ is the grating frequency, and $$\delta(f) = \begin{cases} 1 & f = 0 \\ 0 & f \neq 0. \end{cases}$$

The discretized MTF(f) is shown in table 1, where $f=kf_0$, $k=0,1,2\ldots$ and $f_0=1/T$ is the grating frequency.

TABLE 1

| MTF table | |
|---|---|
| Harmonic (× 1/cycle) | MTF |
| 1 | 0.8065 |
| 2 | 0.5308 |
| 3 | 0.4337 |
| 4 | 0.4165 |
| 5 | 0.3585 |
| 6 | 0.3001 |
| 7 | 0.2736 |
| 8 | 0.2505 |
| 9 | 0.2177 |
| 10 | 0.19 |
| 11 | 0.1739 |
| 12 | 0.1617 |
| 13 | 0.1478 |
| 14 | 0.1345 |
| 15 | 0.1253 |
| 16 | 0.1199 |
| 17 | 0.1158 |
| 18 | 0.111 |
| 19 | 0.1051 |
| 20 | 0.0988 |
| 21 | 0.093 |
| 22 | 0.0878 |
| 23 | 0.0833 |
| 24 | 0.0791 |
| 25 | 0.0751 |
| 26 | 0.0712 |
| 27 | 0.0674 |

TABLE 1-continued

| MTF table | |
|---|---|
| Harmonic (× 1/cycle) | MTF |
| 28 | 0.0638 |
| 29 | 0.0606 |
| 30 | 0.0579 |
| 31 | 0.056 |
| 32 | 0.0546 |
| 33 | 0.0539 |
| 34 | 0.0538 |
| 35 | 0.0541 |
| 36 | 0.0548 |
| 37 | 0.0558 |
| 38 | 0.057 |
| 39 | 0.0582 |
| 40 | 0.0593 |
| 41 | 0.0603 |
| 42 | 0.0609 |
| 43 | 0.0611 |
| 44 | 0.0608 |
| 45 | 0.0599 |
| 46 | 0.0583 |
| 47 | 0.0559 |
| 48 | 0.0529 |
| 49 | 0.0493 |
| 50 | 0.0451 |
| 51 | 0.0406 |
| 52 | 0.0359 |
| 53 | 0.0311 |
| 54 | 0.0266 |
| 55 | 0.0223 |
| 56 | 0.0186 |
| 57 | 0.0153 |
| 58 | 0.0126 |
| 59 | 0.0104 |
| 60 | 0.0089 |
| 61 | 0.0076 |
| 62 | 0.0068 |
| 63 | 0.0062 |
| 64 | 0.0059 |
| 65 | 0.0058 |
| 66 | 0.0057 |
| 67 | 0.0056 |
| 68 | 0.0055 |
| 69 | 0.0053 |
| 70 | 0.0051 |
| 71 | 0.005 |
| 72 | 0.005 |
| 73 | 0.005 |
| 74 | 0.0051 |
| 75 | 0.0055 |

The trapezoidal function's Fourier transform is $$T(f) = C\frac{\sin(\pi f(w-t0)) \times \sin(w)}{f^2} \ f \in (-\infty, \infty)$$

FIG. 14 shows the formation and the definition of the trapezoid.

So the filtered grating spectrum function is $$G'(f) = G(f) \times MTF(f) \times T(f)$$

$$= \sum_{m=1}^{\infty} b_{2m-1} \times T((2m-1) \times f_0) \times$$

$$MTF((2m-1) \times f_0) \times \delta((2m-1) \times f_0)$$

The filtered signal is $g'(x)=F^{-1}(G'(f))$. \qquad (6)

Frequency spectrum optimization

The depression of most high frequency components by optics and receiver makes it possible, by carefully selecting x1, x2, and x3 in FIG. 12, to further depress low-order harmonics that could introduce the nonlinearity into 3D measurement. The linearity's immunity to the 3k (where k=1,2,3 . . . ) harmonics' distortion makes this task easier.

Figure 15:
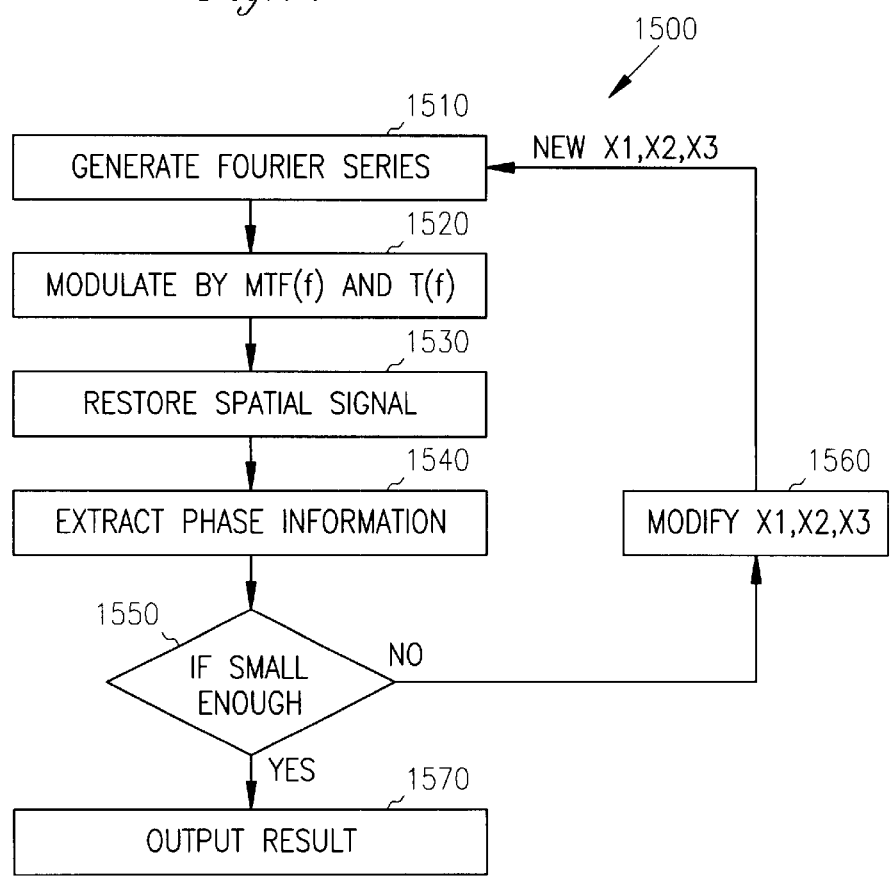
FIG. 15 shows a method 1500 for optimizing grating parameters.

FIG. 15 shows the optimization module used in the design of one embodiment. The objective of the optimization is, by adjusting x1, x2, and x3, to minimize the measurement nonlinearity. Method 1500 starts with an initial set of x1, x2, and x3 values (e.g., estimated from a sine wave), and at block 1510 generates a Fourier series, e.g., using a conventional Fourier transform, at block 1520 modulates the resulting series by MTF(f) and T(f), at block 1530 restores the spatial signal, e.g., using an inverse Fourier transform, at decision 1550, determines if the phase error is small enough, and if not modifies x1, x2, and x3 at block 1560 and iterates through steps 1510–1550 until a satisfactorily small error is achieved to output at block 1570. For one embodiment, the optimized result is: x1=1.25 rad, x2=1.30 rad, and x3=1.464 rad, and the worst case nonlinearity is: 0.2% of a cycle.

Figure 16:
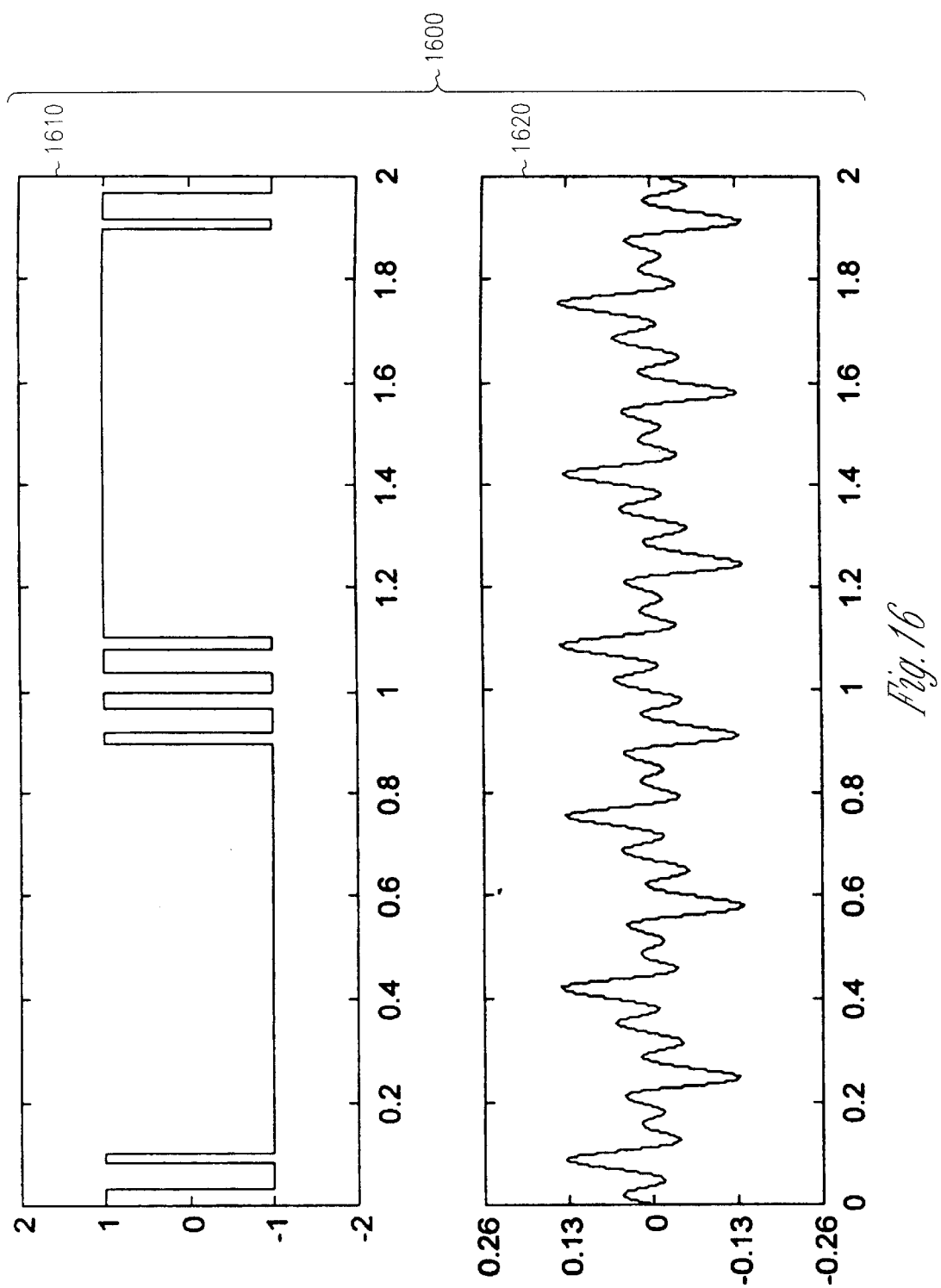
FIG. 16 shows a comparison 1600 of an optimized grating graph 1610 and its nonlinearity graph 1620.

FIG. 16 shows the nonlinearity in one grating cycle under these optimized parameters.

Nonlinearity Analysis

The minimized nonlinearity in FIG. 16 is a theoretical result. In practice it could be worse. In this section, manufacturing accuracy is considered first. The limitation of number of grating cycles is discussed in the section "Phase Shift Error" below.

Manufacturing Error

Figure 17:
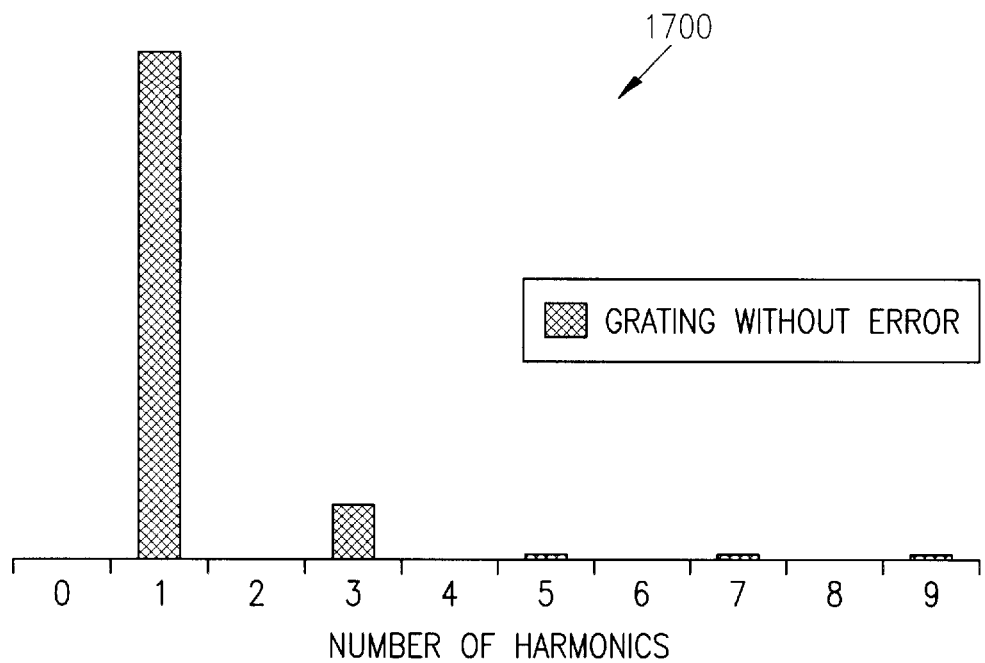
FIG. 17 shows a graph 1700 of harmonics of a grating with no manufacturing error.
Figure 18:
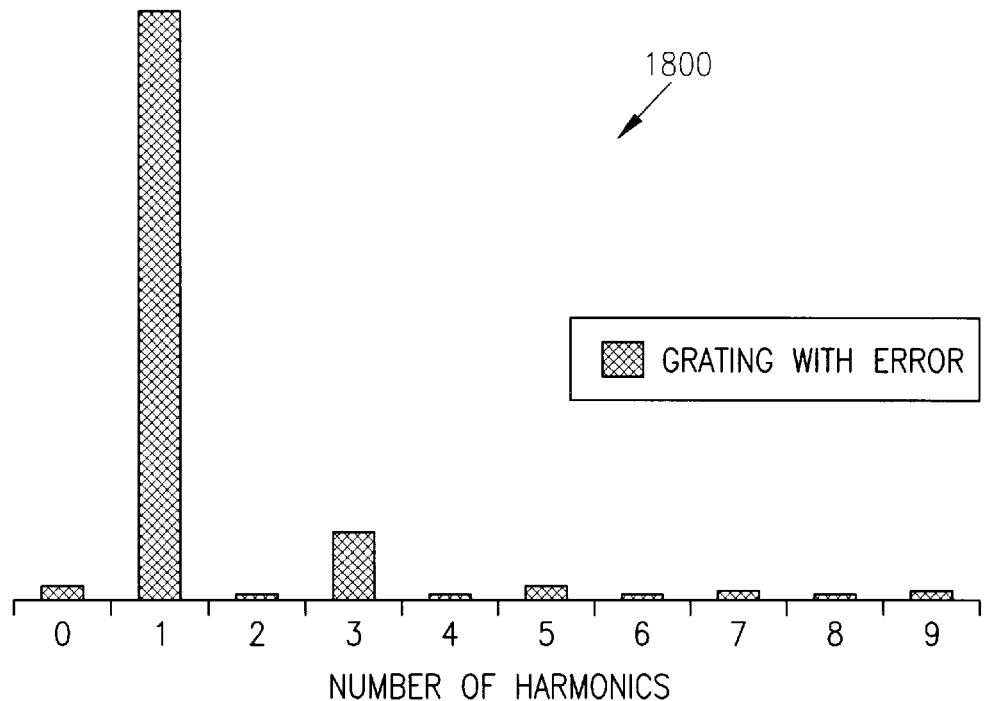
FIG. 18 shows a graph 1800 of harmonics of a grating with +/−0.015 radian manufacturing error.
Figure 19:
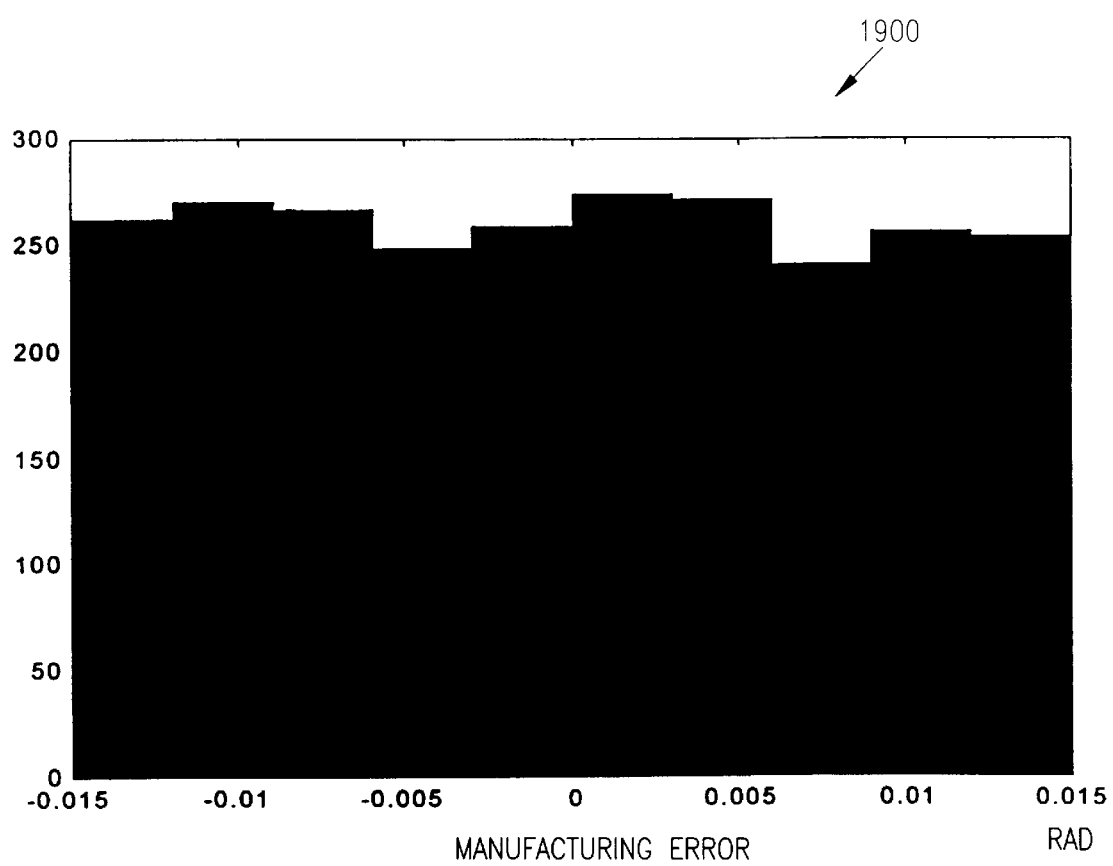
FIG. 19 shows a graph 1900 of distribution of manufacturing error.
Figure 20:
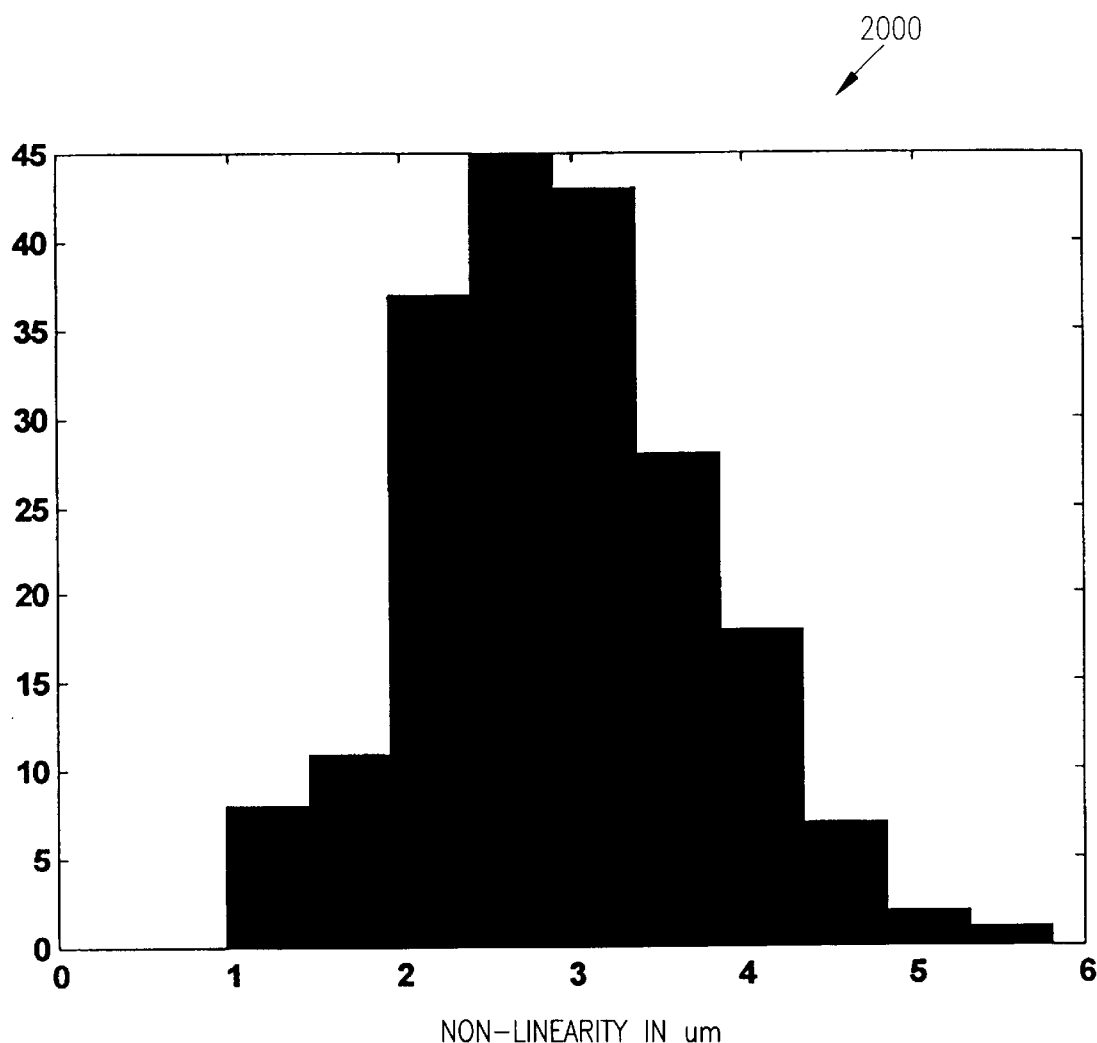
FIG. 20 shows a histogram 2000 of nonlinearity based on the manufacturing error of FIG. 19.

The manufacturing error affects the phase and magnitude of each harmonic and even introduces some component at even harmonics. FIG. 17 and FIG. 18 show the first 9 harmonics of the grating before and after add the possible manufacturing errors. FIG. 19 and FIG. 20 show the histogram of the manufacturing errors and the nonlinearly due to these errors.

Figure 22:
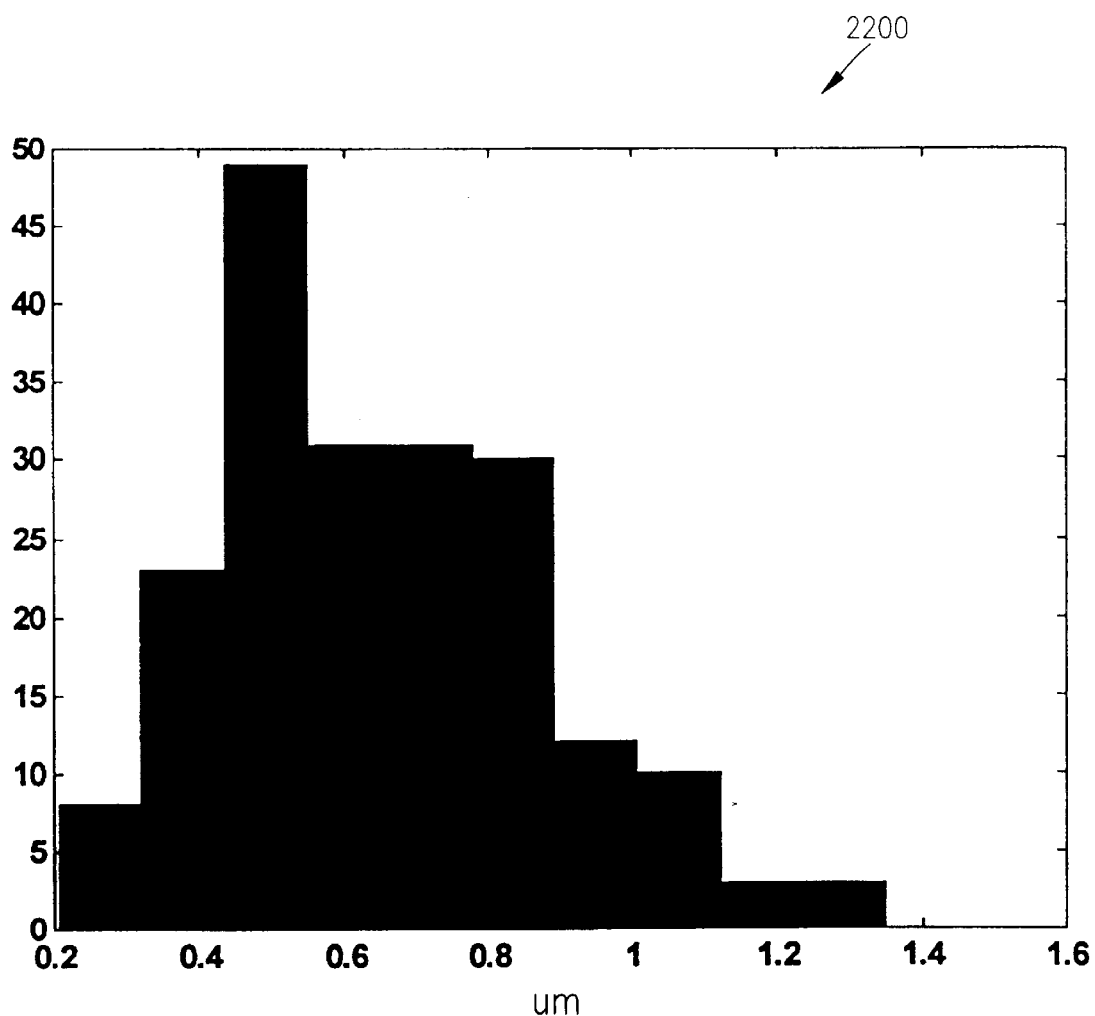
FIG. 22 shows a histogram 2200 of the manufacturing error of the grating of FIG. 21.

To satisfy the nonlinearity requirement the manufacturing accuracy has to be tied up. FIG. 21 and FIG. 22 show the reasonable accuracy requirement and its corresponding nonlinearity histogram. The design in FIG. 18 controls the nonlinearity down to 1.4 um.

Phase shift error

Figure 23:
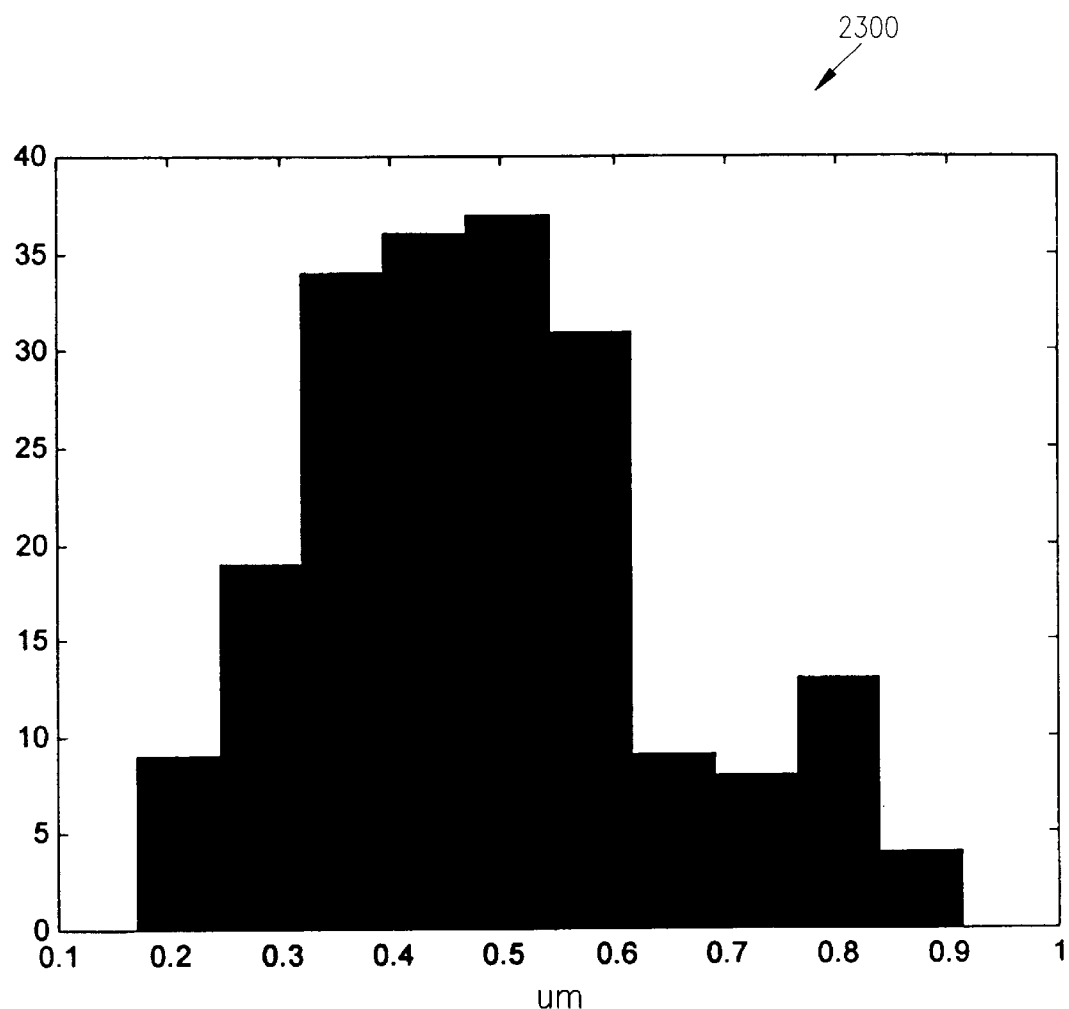
FIG. 23 shows a histogram 2300 of the possible phase shift error of the grating of FIG. 21.
Figure 24:
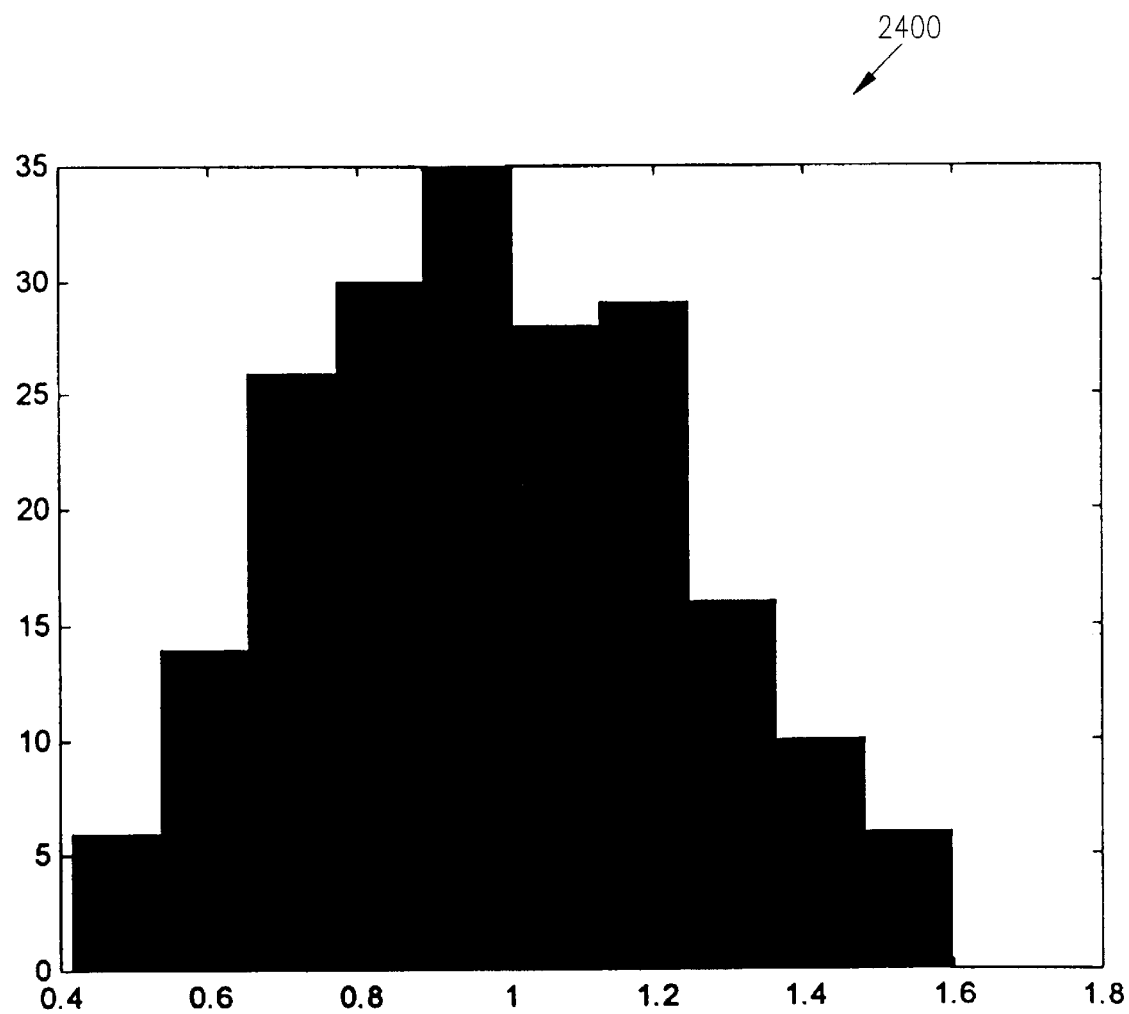
FIG. 24 shows a histogram 2400 of nonlinearity based on the manufacturing error of FIG. 21 and the phase-shift error of FIG. 23.
Figure 25:
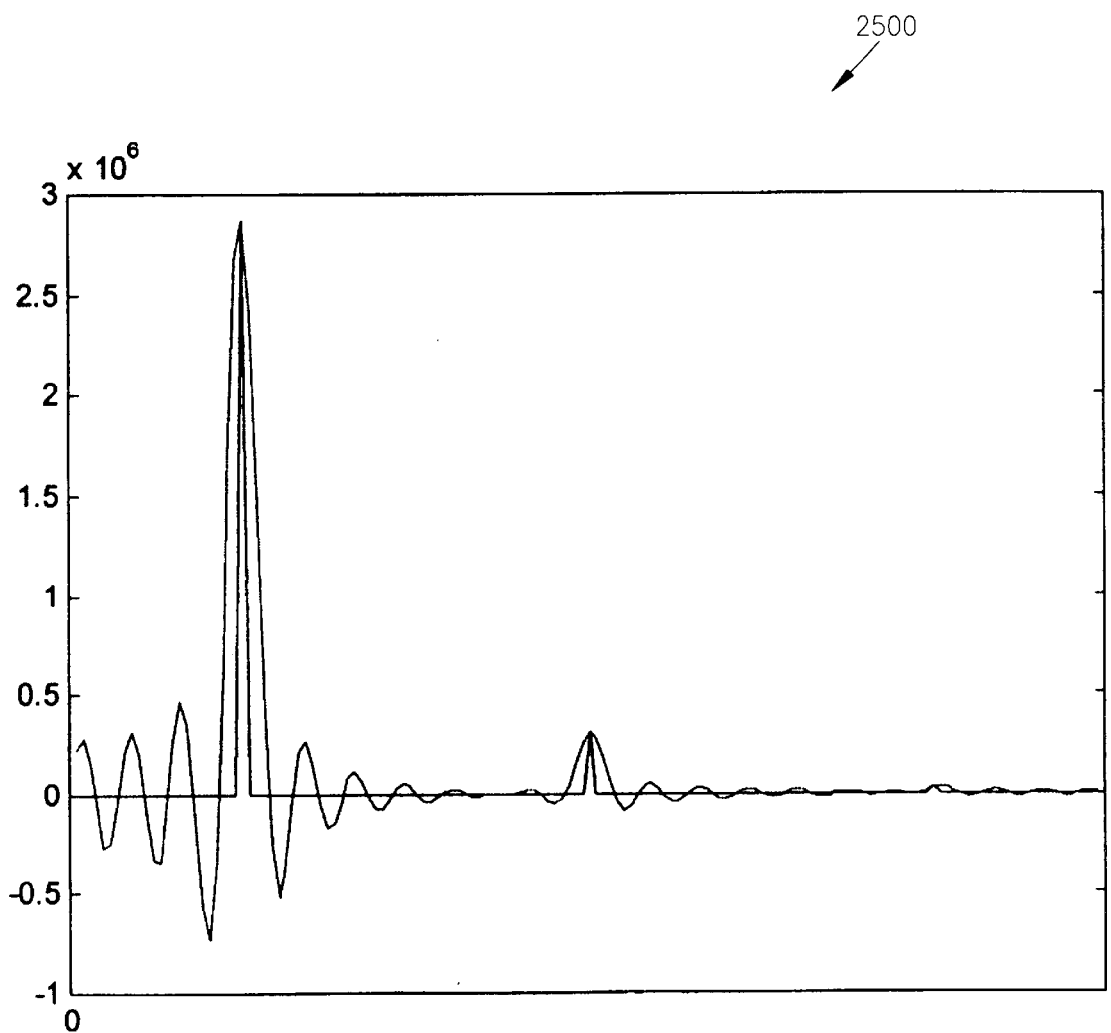
FIG. 25 shows a graph of blur effect in the frequency domain when the number of cycles 102 of a grating 100 is limited to seven.
Figure 26:
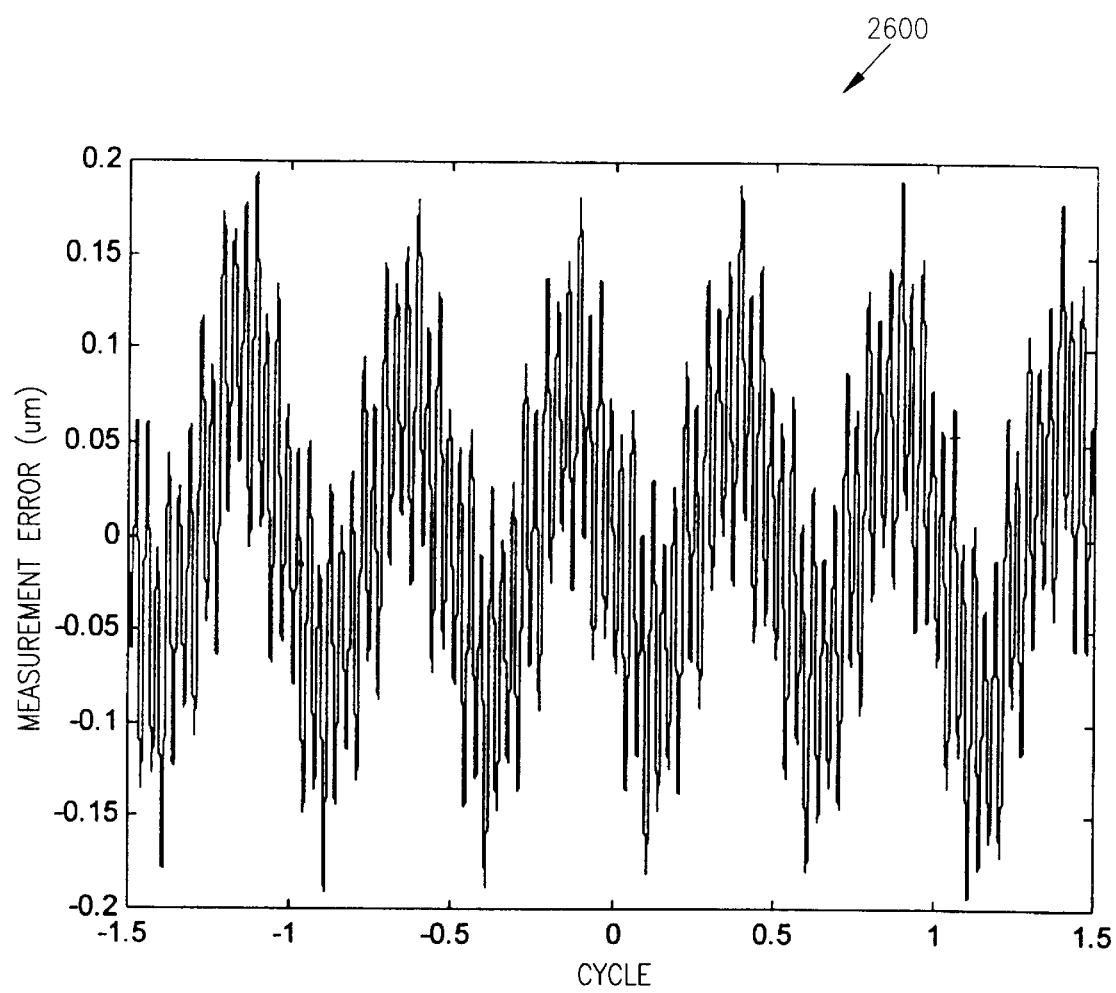
FIG. 26 shows a graph 2600 of measurement error when the number of cycles 102 of a grating 100 is limited to seven.

Ideal sample phase shift is 120 degree. FIG. 23 shows the nonlinearity caused by the possible +−0.5% phase shift error. The errors that the simulation based on are uniform distributed between +−0.5%. FIG. 24 shows nonlinearity while considering both phase shift error and manufacturing errors.

Limited Grating Cycle

In some embodiments, the physical size of the sensor limits the number of grating cycles 102 down to seven, which will make grating's frequency spectrum continuous instead of discrete as discussed above.

Multiply a rectangular function on equation (1):

$$g''(x) = rect\left(\frac{x}{7T}\right) \times g(x) * mtf(x) * t(x) \quad (7)$$

in the corresponding frequency domain:

$$G''(f) = G(f) * \left[\frac{\text{sinc}(7\pi fT)}{f}\right] \times MTF(f) \times T(f) \quad (8)$$

Equation 8 and FIG. 20 show this effect in frequency domain. Compared to equation 6, equation 8 introduces a continuous sinc function, the sinc function will blur the spectrum. The more cycles that a grating has, the sharper sinc function that can be obtained, which means less blurring effect.

FIG. 21 shows the nonlinearity of the middle 3 cycles when assuming there are only 7 cycles 102 per grating 100.

Results

For the grating design described above, the worst case nonlinearity is 1.6 um (FIG. 24) which is mainly due to the possible manufacturing inaccuracy and phase-shift error.

Appendix 1. Derivation of the Grating's Fourier Series.

Grating function $g(x) = \begin{cases} 1 & x \in R1 \\ -1 & x \in R2 \end{cases}$ \quad (A1)

Where $R1 = (\pi/2 - x_n, \pi/2 - x_{n-1}) \cup (\pi/2 - x_{n-2}, \pi/2 - x_{n-3}) \ldots \cup$
$\quad (\pi/2 - x_1, \pi/2 - x_0) \cup (\pi/2 + x_0, \pi/2 + x_1) \cup$
$\quad (\pi/2 + x_2, \pi/2 + x_3) \ldots \cup (\pi/2 + x_{n-2}, \pi/2 + x_{n-1})$ $R2 = (\pi/2 - x_{n-1}, \pi/2 - x_{n-2}) \cup$
$\quad (\pi/2 - x_{n-3}, \pi/2 - x_{n-4}) \ldots \cup (\pi/2 - x_2, \pi/2 - x_1) \cup$
$\quad (\pi/2 + x_1, \pi/2 + x_2) \cup (\pi/2 + x_3, \pi/2 + x_4) \ldots \cup$
$\quad (\pi/2 + x_{n-1}, \pi/2 + x_n)$ Here $R1$ and $R2$ only show one-half period of the grating.

$N$ must be an even integer and $x_0 = 0; x_n = \pi/2$;

For periodic function $g(x)$: \quad (A2)

$$F(f(x)) = a_0 + \sum_{k=1}^{\infty} a_k \cos(kx) + \sum_{k=1}^{\infty} b_k \sin(kx)$$

Since $g(x)$ is also a odd function
$f(-x) = -f(x)$, $a_0 = 0$ and $a_n = 0$;

$$b_k = \frac{1}{\pi}\int_{-\pi}^{\pi} g(x)\sin(kx)dx = \frac{2}{\pi}\int_{0}^{\pi} g(x)\sin(kx)dx \quad (A3)$$

and $$G(f) = F(g(x)) = \sum_{k=1}^{\infty} b_k \sin(kx). \quad (A4)$$

From equations (A1), (A2) and (A3)

$$b_k = \frac{2}{\pi}\int_0^{\pi} f(x)\sin(kx)dx \quad (A5)$$

$= \int_{\frac{\pi}{2}-x_n}^{\frac{\pi}{2}-x_{n-1}} (-\sin(kx)) + \int_{\frac{\pi}{2}-x_{n-1}}^{\frac{\pi}{2}-x_{n-2}} \sin(kx) +$ $\int_{\frac{\pi}{2}-x_{n-2}}^{\frac{\pi}{2}-x_{n-3}} (-\sin(kx)) + \ldots +$ $\int_{\frac{\pi}{2}-x_1}^{\frac{\pi}{2}-x_0} \sin(kx) + \int_{\frac{\pi}{2}+x_{n-1}}^{\frac{\pi}{2}+x_n} (-\sin(kx)) +$ $\int_{\frac{\pi}{2}+x_{n-2}}^{\frac{\pi}{2}+x_{n-1}} \sin(kx) + \int_{\frac{\pi}{2}+x_{n-3}}^{\frac{\pi}{2}+x_{n-2}} (-\sin(kx)) + \ldots +$ $\int_{\frac{\pi}{2}+x_0}^{\frac{\pi}{2}+x_1} \sin(kx)$ -continued $$b_k = \frac{2}{k\pi}\left[\cos kx\Big|_{\frac{\pi}{2}-x_n}^{\frac{\pi}{2}-x_{n-1}} - \cos kx\Big|_{\frac{\pi}{2}-x_{n-1}}^{\frac{\pi}{2}-x_{n-2}} + \cos kx\Big|_{\frac{\pi}{2}-x_{n-2}}^{\frac{\pi}{2}-x_{n-3}} - \ldots + \right.$$
$$\cos kx\Big|_{\frac{\pi}{2}-x_2}^{\frac{\pi}{2}-x_1} - \cos kx\Big|_{\frac{\pi}{2}-x_1}^{\frac{\pi}{2}-x_0} + \cos kx\Big|_{\frac{\pi}{2}+x_{n-1}}^{\frac{\pi}{2}+x_n} -$$
$$\cos kx\Big|_{\frac{\pi}{2}+x_{n-2}}^{\frac{\pi}{2}+x_{n-1}} + \cos kx\Big|_{\frac{\pi}{2}+x_{n-3}}^{\frac{\pi}{2}+x_{n-2}} - \ldots + \cos kx\Big|_{\frac{\pi}{2}+x_1}^{\frac{\pi}{2}+x_2} -$$
$$\left.\cos kx\Big|_{\frac{\pi}{2}+x_0}^{\frac{\pi}{2}+x_1}\right]$$

$$= \frac{2}{k\pi}\left[-\cos\left(k\left(\frac{\pi}{2}-x_n\right)\right) + 2\cos\left(k\left(\frac{\pi}{2}-x_{n-1}\right)\right) - \right.$$
$$2\cos\left(k\left(\frac{\pi}{2}-x_{n-2}\right)\right) + \ldots + 2\cos\left(k\left(\frac{\pi}{2}-x_1\right)\right) -$$
$$\cos\left(k\left(\frac{\pi}{2}-x_0\right)\right) + 2\cos\left(k\left(\frac{\pi}{2}+x_n\right)\right) -$$
$$2\cos\left(k\left(\frac{\pi}{2}+x_{n-1}\right)\right) - \ldots - 2\cos\left(k\left(\frac{\pi}{2}+x_1\right)\right) +$$
$$\left.\cos\left(k\left(\frac{\pi}{2}+x_0\right)\right)\right]$$ (A6)

When $k = 2m$ where $m = 1, 2, 3\ldots$ $$b_{2m} = \frac{2}{k\pi}[-\cos(m\pi - 2mx_n) + 2\cos(m\pi - 2mx_{n-1}) - \\ 2\cos(m\pi - 2mx_{n-2}) + \ldots + 2\cos(m\pi - 2mx_1) - \\ \cos(m\pi - 2mx_0) + \cos(m\pi + 2mx_n) - \\ 2\cos(m\pi + 2mx_{n-1}) + 2\cos(m\pi - 2mx_{n-2}) - \ldots - \\ 2\cos(m\pi - 2mx_1) + \cos(m\pi + 2mx_0)]$$
$$= 0$$ (A7)

so $g(x)$ only consists of odd harmonics

Let where $k = 2m - 1, m = 1, 2, 3\ldots$ $$b_{2m-1} = \frac{2}{k\pi}\left[-\cos\left(m\pi - \frac{\pi}{2} - kx_n\right) + 2\cos\left(m\pi - \frac{\pi}{2} - kx_{n-1}\right) - \right.$$
$$2\cos\left(m\pi - \frac{\pi}{2} - kx_{n-2}\right) + \ldots + 2\cos\left(m\pi - \frac{\pi}{2} - kx_1\right) -$$
$$\cos\left(m\pi - \frac{\pi}{2} - kx_0\right) + \cos\left(m\pi - \frac{\pi}{2} + kx_n\right) -$$
$$2\cos\left(m\pi - \frac{\pi}{2} + kx_{n-1}\right) + 2\cos\left(m\pi - \frac{\pi}{2} - kx_{n-2}\right) - \ldots -$$
$$\left.2\cos\left(m\pi - \frac{\pi}{2} + kx_1\right) + \cos\left(m\pi - \frac{\pi}{2} + kx_0\right)\right]$$
$$= \frac{2}{k\pi}[-\sin(m\pi - kx_n) + 2\sin(m\pi - kx_{n-1}) - \\ 2\sin(m\pi - kx_{n-2}) + \ldots + 2\sin(m\pi - kx_1) - \\ \sin(m\pi - kx_0) + \sin(m\pi + kx_n) - 2\sin(m\pi + kx_{n-1}) + \\ 2\sin(m\pi + kx_{n-2}) - \ldots - 2\sin(m\pi + kx_1) + \\ \sin(m\pi + kx_0)]$$ (A8)

In equation A8, $x_0 = 0$ (see grating definition at equation(1)), so $2\sin(m\pi + kx_0) = 0$;

$x_n = \pi/2$, so $$2\sin(m\pi + kx_n) = 2\sin(m\pi + k\pi/2)$$
$$= 2\sin(m\pi - \pi/2)$$
$$= -2.$$

-continued

So:

$$b_{2m-1} = \frac{4}{(2m-1)\pi}\left\{-1 + 2\sum_{i=1}^{n-1}[\sin((2m-1)x_i) \times \\ (-1)^{i-1}(-1)^{m-1}]\right\}$$ (A9)

$i = 1, 2, \ldots n$ and $n$ must be an even number, $m = 1, 2, \ldots \infty$.

Consider the two-side spectrum:

$$b_{2m-1} = \frac{2}{(2m-1)\pi}\left\{-1 + 2\sum_{i=1}^{n-1}[\sin((2m-1)x_i) \times \\ (-1)^{i-1}(-1)^{m-1}]\right\} \quad m = -\infty \sim +\infty$$ (A10)

So $$F(g(x)) = \sum_{m=1}^{\infty} b_{2m-1}\sin((2m-1)x)$$ (A11)

where $$b_{2m-1} = \frac{2}{(2m-1)\pi}\left\{-1 + 2\sum_{i=1}^{n-1}[\sin((2m-1)x_i) \times \\ (-1)^{i-1}(-1)^{m-1}]\right\}$$

In the embodiment described above, we use n = 4:

$$b_{2m-1} = \frac{2}{(2m-1)\pi}\{-1 + 2 \times (-1)^{m-1} \times [\sin((2m-1)x_1) - \\ \sin((2m-1)x_2) + \sin((2m-1)x_3)\}$$

Conclusion

In the context of a machine-vision system for inspecting a part, this invention includes methods and apparatus to provide high-speed high-accuracy 3D inspection of manufactured parts, using a binary grating, filling the projection aperture evenly with source light, using an elongated projection aperture in order to obtain both a large depth of field focus as well as maximizing the amount of projected light, using a telecentric projection lens, and/or satisfying Scheimpflug's condition relative to the plane of the projection grating and the height plane at the object being measured. The present invention also provides a method for designing a binary grating to provide a linear result to within a given tolerance.

One aspect of the present invention provides a machine-vision system 1000 for inspecting an object 99. This system 1000 includes an inspection station 400 that support the object, a scanning mechanism positioned to scan the inspection station, an imager head coupled to the scanning mechanism 408, wherein the scanning mechanism 408 moves the imager head 401 in a linear motion to scan the object at the inspection station. The imager head includes a grating 100 or 500 or 700 having a first region 103 including a cyclic pattern of substantially clear stripes and substantially opaque stripes, wherein each cycle 102 includes a first substantially clear stripe 121 of a first width, a first substantially opaque stripe 114 of second width, and between the first substantially clear stripe 121 and the first substantially opaque stripe 114 are a second substantially opaque stripe 124 of a third width narrower than the first width and narrower than the second width, and a second substantially clear stripe 111 of a fourth width narrower than the first width and narrower than the second width.

In some embodiments, the first width is substantially the same width as the second width, and the third width is substantially the same width as the fourth width.

In some embodiments, each cycle of the grating further includes a third substantially clear stripe 123 of a fifth width, a third substantially opaque stripe 112 of substantially the same width as the fifth width, the fifth width being wider than the third width.

In some embodiments, each cycle of the grating further includes a fourth substantially clear stripe 113 of a sixth width, a fourth substantially opaque stripe 122 of substantially the same width as the sixth width, the sixth width being narrower than the third width.

In some embodiments, the grating 500 includes a second region 503 including a repeated cycle pattern of substantially clear stripes and substantially opaque stripes, wherein each cycle of the second region is wider than a corresponding cycle of the first region.

In some embodiments, the imager head 401 further includes a light source 1110 having an emission region emitting light, and a diffuser 1105 located in a light path of the light.

In some embodiments, the imager head 401 further includes a cylindrical lens 1107 located in the light path of the light, and a projection lens mask 1115 having an elongated aperture, also located in the light path of the light, wherein the cylindrical lens helps focus the light to fill the aperture 1115 substantially evenly.

In some embodiments, the imager head 401 further includes a cylindrical lens 1107 and a diffuser 1105 located in the light path of the light, and a projection lens mask having an elongated aperture, also located in the light path of the light, wherein the cylindrical lens and the diffuser help focus the light to fill the aperture substantially evenly.

In some embodiments, the projection lens 810 is a telecentric lens.

In some embodiments, the imager head 401 further includes a light source having an emission region emitting light, a diffuser located in a light path of the light, wherein the diffuser is a low-loss holographic diffuser, a cylindrical lens located in the light path of the light, and a projection lens mask having an elongated aperture, also located in the light path of the light, wherein the emission region is elongated, and wherein the cylindrical lens helps focus the light to fill the aperture substantially evenly.

Another aspect of the present invention provides a method of making a striped binary grating for use in a 3-dimensional scanning apparatus used to determine a geometry of an object having at least one surface to be measured. The method includes projecting a first repeated cycle pattern of substantially illuminated stripes and substantially dark stripes, wherein each cycle includes a first substantially illuminated stripe of a first width, a first substantially dark stripe of second width, and between the first substantially illuminated stripe and the first substantially dark stripe are a second substantially dark stripe of a third width narrower than the first width and narrower than the second width, and a second substantially illuminated stripe of a fourth width narrower than the first width and narrower than the second width.

In some embodiments of the method, the first width is substantially the same width as the second width, and the third width is substantially the same width as the fourth width.

In some embodiments of the method, each projected cycle further includes a third substantially illuminated stripe of a fifth width, a third substantially dark stripe of substantially the same width as the fifth width, the fifth width being narrower than the third width.

In some embodiments of the method, each projected cycle further includes a fourth substantially illuminated stripe of a sixth width, a fourth substantially dark stripe of substantially the same width as the sixth width, the sixth width being wider than the third width.

Some embodiments of the method further include projecting a second repeated cycle pattern of substantially illuminated stripes and substantially dark stripes, wherein each cycle of the second pattern includes a repeated cycle pattern of substantially illuminated stripes and substantially dark stripes, wherein each cycle of the second pattern is wider than a corresponding cycle of the first pattern.

Some embodiments of the method further include emitting light, and diffusing the emitted light, wherein the diffused light is used in the projecting.

Some embodiments of the method further include cylindrically focussing the diffused light to fill an elongated aperture substantially evenly, and telecentrically focussing the light of the elongated aperture to the object.

Some embodiments of the method further include emitting light, cylindrically focussing the light to fill an elongated aperture substantially evenly, and telecentrically focussing the light of the elongated aperture to the object.

Some embodiments of the method further include diffusing the emitted light.

Another aspect of the present invention provides a projection grating for use in a machine-Vision system for inspecting an object. The grating includes a binary grating having a cycle pattern, wherein each cycle includes a first substantially clear stripe of a first width and a first substantially opaque stripe of substantially the first width, and between the first substantially clear stripe and the first substantially opaque stripe are a second substantially opaque stripe of a second width narrower than the first width, and a second substantially clear stripe of substantially the second width.

In some embodiments, the cycle pattern is symmetric. In some embodiments, a pattern of a plurality of clear stripes and a plurality of opaque stripes are alternated between the first substantially clear stripe and the first substantially opaque stripe and a complementary pattern of a plurality of opaque stripes and a plurality of clear stripes are alternated on an opposite side of the first substantially clear stripe. In some embodiments, the cycle pattern is defined by three width parameters. In some embodiments, the cycle pattern is defined by three width parameters with values of about 1.25, 1.30, and 1.464 radians.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A machine-vision system for inspecting an object, comprising:
   an inspection station that support the object;
   a scanning mechanism positioned to scan the inspection station;
   an imager head coupled to the scanning mechanism, wherein the scanning mechanism moves the imager head in a linear motion to scan the object at the inspection station, the imager head including:

a grating having a first region including a cyclic pattern of substantially clear stripes and substantially opaque stripes, wherein each cycle includes a first substantially clear stripe of a first width, a first substantially opaque stripe of second width, and between the first substantially clear stripe and the first substantially opaque stripe are a second substantially opaque stripe of a third width narrower than the first width and narrower than the second width, and a second substantially clear stripe of a fourth width narrower than the first width and narrower than the second width.

2. The machine-vision system of claim 1, wherein the first width is substantially the same width as the second width, and the third width is substantially the same width as the fourth width.

3. The machine-vision system of claim 2, wherein each cycle of the grating further includes a third substantially clear stripe of a fifth width, a third substantially opaque stripe of substantially the same width as the fifth width, the fifth width being narrower than the third width.

4. The machine-vision system of claim 3, wherein each cycle of the grating further includes a fourth substantially clear stripe of a sixth width, a fourth substantially opaque stripe of substantially the same width as the sixth width, the sixth width being wider than the third width.

5. The machine-vision system of claim 1, wherein the grating includes a second region including a repeated cycle pattern of substantially clear stripes and substantially opaque stripes, wherein each cycle of the second region is wider than a corresponding cycle of the first region.

6. The machine-vision system of claim 1, wherein the imager head further includes:

a light source having an emission region emitting light; and a diffuser located in a light path of the light.

7. The machine-vision system of claim 6, wherein the imager head further includes:

a cylindrical lens located in the light path of the light; and a projection lens mask having an elongated aperture, also located in the light path of the light, wherein the cylindrical lens helps focus the light to fill the aperture substantially evenly.

8. The machine-vision system of claim 1, wherein the imager head further includes:

a cylindrical lens located in the light path of the light; and a projection lens mask having an elongated aperture, also located in the light path of the light, wherein the cylindrical lens helps focus the light to fill the aperture substantially evenly.

9. The machine-vision system of claim 7, wherein the projection lens is a telecentric lens.

10. The machine-vision system of claim 4, wherein the imager head further includes:

a light source having an emission region emitting light;

a diffuser located in a light path of the light, wherein the diffuser is a low-loss holographic diffuser;

a cylindrical lens located in the light path of the light; and a projection lens mask having an elongated aperture, also located in the light path of the light, wherein the emission region is elongated, and wherein the cylindrical lens helps focus the light to fill the aperture substantially evenly.

11. A method of making a striped binary grating for use in a 3-dimensional scanning apparatus used to determine a geometry of an object having at least one surface to be measured, the method comprising:

(a) projecting a first repeated cycle pattern of substantially illuminated stripes and substantially dark stripes, wherein each cycle includes a first substantially illuminated stripe of a first width, a first substantially dark stripe of second width, and between the first substantially illuminated stripe and the first substantially dark stripe are a second substantially dark stripe of a third width narrower than the first width and narrower than the second width, and a second substantially illuminated stripe of a fourth width narrower than the first width and narrower than the second width.

12. The method of claim 11, wherein the first width is substantially the same width as the second width, and the third width is substantially the same width as the fourth width.

13. The method of claim 12, wherein each projected cycle further includes a third substantially illuminated stripe of a fifth width, a third substantially dark stripe of substantially the same width as the fifth width, the fifth width being narrower than the third width.

14. The method of claim 13, wherein each projected cycle further includes a fourth substantially illuminated stripe of a sixth width, a fourth substantially dark stripe of substantially the same width as the sixth width, the sixth width being wider than the third width.

15. The method of claim 11, further comprising projecting a second repeated cycle pattern of substantially illuminated stripes and substantially dark stripes, wherein each cycle of the second pattern includes a repeated cycle pattern of substantially illuminated stripes and substantially dark stripes, wherein each cycle of the second pattern is wider than a corresponding cycle of the first pattern.

16. The method of claim 11, further comprising:

emitting light; and diffusing the emitted light, wherein the diffused light is used in the projecting.

17. The method of claim 16, further comprising:

cylindrically focussing the diffused light to fill an elongated aperture substantially evenly; and telecentrically focussing the light of the elongated aperture to the object.

18. The method of claim 11, further comprising:

emitting light;

cylindrically focussing the light to fill an elongated aperture substantially evenly; and telecentrically focussing the light of the elongated aperture to the object.

19. The method of claim 11, further comprising:

diffusing the emitted light.

20. A projection grating for use in a machine-vision system for inspecting an object, comprising:

a binary grating having a cycle pattern, wherein each cycle includes a first substantially clear stripe of a first width and a first substantially opaque stripe of substantially the first width, and between the first substantially clear stripe and the first substantially opaque stripe are a second substantially opaque stripe of a second width narrower than the first width, and a second substantially clear stripe of substantially the second width.

21. The projection grating of claim 20, wherein the cycle pattern is symmetric.

22. The projection grating of claim 21, wherein a pattern of a plurality of clear stripes and a plurality of opaque stripes are alternated between the first substantially clear stripe and the first substantially opaque stripe and a complementary pattern of a plurality of opaque stripes and a plurality of clear stripes are alternated on an opposite side of the first substantially clear stripe.

23. The projection grating of claim 21, wherein the cycle pattern is defined by three width parameters.

24. The projection grating of claim 21, wherein the cycle pattern is defined by three width parameters with values of about 1.25, 1.30, and 1.464 radians.

* * * * *